US011132837B2

(12) United States Patent
Cordes et al.

(10) Patent No.: US 11,132,837 B2
(45) Date of Patent: *Sep. 28, 2021

(54) IMMERSIVE CONTENT PRODUCTION SYSTEM WITH MULTIPLE TARGETS

(71) Applicant: LUCASFILM ENTERTAINMENT COMPANY LTD. LLC, San Francisco, CA (US)

(72) Inventors: Roger Cordes, San Francisco, CA (US); Nicholas Rasmussen, San Francisco, CA (US); Kevin Wooley, San Francisco, CA (US); Rachel Rose, San Francisco, CA (US)

(73) Assignee: LUCASFILM ENTERTAINMENT COMPANY LTD. LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/676,159

(22) Filed: Nov. 6, 2019

(65) Prior Publication Data
US 2020/0145644 A1    May 7, 2020

Related U.S. Application Data

(60) Provisional application No. 62/756,511, filed on Nov. 6, 2018, provisional application No. 62/775,719, filed on Dec. 5, 2018.

(51) Int. Cl.
*G06T 15/50* (2011.01)
*G06T 19/00* (2011.01)
(Continued)

(52) U.S. Cl.
CPC .............. *G06T 19/003* (2013.01); *G06T 7/20* (2013.01); *G06T 7/70* (2017.01); *G06T 15/20* (2013.01);
(Continued)

(58) Field of Classification Search
None
See application file for complete search history.

(56) References Cited

U.S. PATENT DOCUMENTS 6,784,856 B2    8/2004 Berstis
7,734,070 B1 *  6/2010 Sharma ................. G11B 27/28
                                                    382/118
(Continued)

FOREIGN PATENT DOCUMENTS

JP      6245567 B1      12/2017
KR  20180094253 A       8/2018

OTHER PUBLICATIONS

PCT/US2019/060081, "International Search Report and Written Opinion", dated Apr. 8, 2020, 11 pages.
(Continued)

Primary Examiner — Anh-Tuan V Nguyen
(74) Attorney, Agent, or Firm — Kilpatrick Townsend & Stockton LLP

(57) ABSTRACT

An immersive content presentation system and techniques that can detect and correct lighting artifacts caused by movements of one or more taking camera in a performance area consisting of multiple displays (e.g., LED or LCD displays). The techniques include capturing, with a camera, a plurality of images of a performer performing in a performance area at least partially surrounded by one or more displays presenting images of a virtual environment. Where the images of the virtual environment within a frustum of the camera are updated on the one or more displays based on movement of the camera, and images of the virtual environment outside of the frustum of the camera are not updated based on movement of the camera. The techniques further include generating content based on the plurality of captured images.

20 Claims, 14 Drawing Sheets

(51) Int. Cl.

| | |
|---|---|
| *H04N 5/232* | (2006.01) |
| *H04N 5/272* | (2006.01) |
| *G06T 7/70* | (2017.01) |
| *H04N 13/156* | (2018.01) |
| *H04N 13/111* | (2018.01) |
| *H04N 13/282* | (2018.01) |
| *G06T 7/20* | (2017.01) |
| *G06T 15/20* | (2011.01) |
| *H04N 5/247* | (2006.01) |

(52) U.S. Cl.
CPC ............ *G06T 15/50* (2013.01); *G06T 19/006* (2013.01); *H04N 5/23238* (2013.01); *H04N 5/23299* (2018.08); *H04N 5/247* (2013.01); *H04N 5/272* (2013.01); *H04N 13/111* (2018.05); *H04N 13/156* (2018.05); *H04N 13/282* (2018.05); *G06T 2207/30244* (2013.01)

(56) References Cited

U.S. PATENT DOCUMENTS

| | | | |
|---|---|---|---|
| 9,121,577 | B2 | 9/2015 | Hajjar et al. |
| 10,489,968 | B1 | 11/2019 | Livingston et al. |
| 2001/0035848 | A1 | 11/2001 | Johnson et al. |
| 2004/0223190 | A1* | 11/2004 | Oka ................... G06T 19/006 358/302 |
| 2005/0072032 | A1 | 4/2005 | Mccollum et al. |
| 2005/0099603 | A1* | 5/2005 | Thomas ............... G03B 15/06 352/85 |
| 2010/0229741 | A1 | 9/2010 | Kerz et al. |
| 2011/0134204 | A1* | 6/2011 | Rodriguez ............ G06Q 10/10 348/14.03 |
| 2011/0157318 | A1* | 6/2011 | Nalibotski ........... H04N 13/161 348/47 |
| 2011/0304735 | A1* | 12/2011 | Van Eaton ............. H04N 5/262 348/159 |
| 2013/0002815 | A1* | 1/2013 | Smoot .................... G06F 3/011 348/43 |
| 2015/0350628 | A1 | 12/2015 | Sanders et al. |
| 2016/0048988 | A1 | 2/2016 | Lee et al. |
| 2016/0343166 | A1* | 11/2016 | Inoko ...................... G06T 7/73 |
| 2017/0076491 | A1 | 3/2017 | Jiang et al. |
| 2017/0078447 | A1* | 3/2017 | Hancock ............... G06F 1/3215 |
| 2017/0078654 | A1* | 3/2017 | Facin .................. G06F 3/04815 |
| 2017/0339440 | A1 | 11/2017 | Galpin et al. |
| 2018/0157047 | A1 | 6/2018 | Chapman et al. |
| 2019/0015177 | A1 | 1/2019 | Elazar et al. |
| 2019/0066349 | A1* | 2/2019 | Huang .................. G06F 3/1454 |
| 2019/0082118 | A1* | 3/2019 | Wang ................. H04N 5/23229 |
| 2019/0102949 | A1* | 4/2019 | Sheftel ................... G06T 15/20 |

OTHER PUBLICATIONS

U.S. Appl. No. 16/676,212, "Non-Final Office Action", dated Dec. 14, 2020, 28 pages.

U.S. Appl. No. 16/676,212, "Notice of Allowance", dated Jun. 1, 2021, 13 pages.

PCT/US2019/060081, "International Preliminary Report on Patentability", dated May 20, 2021, 8 pages.

* cited by examiner

IMMERSIVE CONTENT PRODUCTION SYSTEM WITH MULTIPLE TARGETS

CROSS-REFERENCES TO RELATED APPLICATIONS

This application claims priority to U.S. Provisional Patent Application Ser. No. 62/756,511, filed Nov. 6, 2018, entitled "Immersive Content Production System," which is herein incorporated by reference in its entirety and for all purposes. This application also claims priority to U.S. Provisional Patent Application Ser. No. 62/775,719, filed Dec. 5, 2018, entitled "Display for Immersive Content Production System," which is herein incorporated by reference in its entirety and for all purposes.

This application is related to concurrently filed U.S. Nonprovisional application Ser. No. 16/676,212, entitled "Immersive Content Production System" by Cordes et al, which is incorporated herein by reference.

FIELD

This application discloses technology related to the fields of computer animation, virtual reality environments, and digital content generation. Specifically, this application generally relates to generating content using an immersive content production system.

BACKGROUND

One method of creating a virtual reality experience can include surrounding a user with large display screens that present a virtual environment to the user. For example, an immersive content system that can be used in the production of movies or other video content can include a stage or performance area that is at least partially enclosed with one or more walls and/or a ceiling each of which can be covered with display screens. One or more cameras can be placed in the performance area and live actors can interact with props placed on the stage as well as with virtual elements displayed on the one or more displays.

Such immersive content systems can be very useful in the production of video content but present challenges that must be overcome to ensure video captured of an actor's performance using the system does not include undesirable or unrealistic artifacts.

SUMMARY

Embodiments of the invention are directed to an immersive content production system. For example, immersive content (e.g., virtual reality content, mixed reality content, augmented reality content, etc.) can be leveraged as part of a system used by users (e.g., artists, engineers, technicians, directors, and other individuals involved in content production) in order to generate content (e.g., movies, television programming, online or streamed videos, etc.). As described herein, the immersive content production system can also be referred to as simply a "content production system" or as a "production system".

In one aspect, an immersive content production system according to the invention can present images in real-time or at interactive frame rates to users of the content production system. The images can be presented via an immersive environment in which a performance area, such as a stage, is partially or completely surrounded by display screens on which the immersive content is presented. In this way, a performer (e.g., an actor or actress) in the performance area can appear to be within a virtual environment created on the display screens.

A taking camera can be aimed at the performance area to capture the performance of the performer as well as the virtual environment displayed by the image displays (e.g., LED or LCD displays) behind the performer. In some embodiments, sensors can be used to determine the position and orientation of the taking camera during a performance. For example, GPS based sensors can be attached to the taking camera to determine its position within or relative to the performance area. As another example, other cameras can be directed at the taking camera as the taking camera captures the performance. One or more markers can be attached to the taking camera. During a performance, the other cameras can capture images of the taking camera as the taking camera is moved and/or oriented during the performance. The production system can use the images captured of the taking camera to determine the movement and orientation of the taking camera during the performance. Such information can be used to support the content production process. For example, such information regarding the orientation and movement of the taking camera can be used to determine the distance of the taking camera from the performer over a performance. Based on the orientation and movement (and other attributes such as lens aperture and focal length) of the taking camera, the content production system can adjust a portion of the virtual environment displayed by the immersive cave or walls in real-time or at interactive frame rates to correspond to orientation and position of the camera. In this way, images of the virtual environment can be perspective-correct (from the tracked position and perspective of the taking camera) over a performance of the performer.

The inventors have recognized that, in some instances, presenting perspective-correct images (as rendered from the tracked position and perspective of the taking camera) onto surrounding LED or LCD display walls and ceilings can present view-dependent lighting artifacts on the physical foreground components within the performance area (e.g. the performers/actors, props, and physical set decoration). For example, as the taking camera moves, updating the LED or LCD display walls with perspective-correct images can lead to a visual discrepancy between the static physical set within the performance area and the virtual assets of the virtual environment displayed on the display walls. As a result, as the taking camera moves, lighting effecting performers on the stage can change. For example, light sources, such as a virtual sun or street lamp in the virtual environment, might appear to move across the performer, across props on the stage, and across the set decorations, just because the taking camera is physically moving. Thus, it might appear that the virtual light source moves relative to a performer based on movement of the taking camera when in fact the position of the virtual light source relative to the performer should not change.

Embodiments of the invention can mitigate such visual artifacts by performing two separate renderings of the content to be displayed within the immersive environment. The two renderings can be performed simultaneously and in real time and then combined to form the content that is displayed within the immersive environment.

In one rendering, a global view the virtual environment (including any virtual assets) is rendered independent from the perspective of the taking camera. In some embodiments, the images of the virtual environment rendered by global view rendering can remain static. In other words, objects within the virtual environment might not change their location or otherwise move on the display over time or during a performance within the global view. In some embodiments, the images of the virtual environment generated in the global view rendering can be used for lighting and reflection purposes onto the physical foreground (i.e., onto the performance area).

In another rendering, a portion of the virtual environment is rendered from the tracked position of and the perspective of the taking camera. Such a rendering is sometimes referred to herein as a "perspective-correct rendering". This perspective-correct rendering can be done for the portion of the display walls within the immersive environment that is viewable by the frustum of the taking camera.

In some embodiments, the images of the virtual environment can be updated over a performance such that the perspective of the virtual environment displayed compensates for corresponding changes to the positioning and orientation of the taking camera. For example, the immersive environment can display the perspective-correct render in the portion of the display walls that is viewable by the frustum of the taking camera while the portions of the display walls outside of the frustum of the taking camera display the rendered images from the global view. In this manner, the perspective-correct rendering of the virtual environment can be thought of as a patch that replaces a corresponding portion of the global view rendering where the two renderings overlap within the immersive environment. Limiting the perspective-correct rendering to the area of overlap can reduce or even eliminate undesirable lighting effects. For example, as discussed herein, in some embodiments the virtual environment will remain generally static for images of the global view. Limiting the perspective-correct imagery to the frustum of the camera minimizes lighting and reflection artifacts from shifting perspectives as the camera position changes over a performance. In some instances, as the taking camera moves, different portions of the LED or LCD walls will fall within the frustum of the taking camera. As such, a particular portion of the LED or LCD walls can display images of the global view render or images of the perspective-correct render depending on the position and orientation of the taking camera at a given point during a performance.

Some embodiments of the invention include multiple taking cameras and interleave the immersive content generated for each camera's field of view such that, for each taking camera, immersive content viewed by the camera is generated from its perspective correct view. The immersive content can be generated at a high frequency (e.g., 48 frames per second) and the frame rate of each camera can set such that no two cameras are capturing content at the same time. For example, in a production system that generates immersive content at a rate of 48 fps and includes two taking cameras, each taking camera can be set to a rate of 24 fps with a first taking camera capturing images on even frames and the second capturing images on odd frames.

In one aspect a computer-implemented method of generating content includes capturing a plurality of images of a performer performing in a performance area using a camera. The performer is at least partially surrounded by one or more displays presenting images of a virtual environment. The images of the virtual environment within a frustum of the camera can be updated on the one or more displays based on movement of the camera The images of the virtual environment outside of the frustum of the camera are not updated based on movement of the camera. The method can include generating content based on the plurality of captured images.

The method can include tracking a position of the camera within the performance area. The frustum can be determined from the position (e.g., height of camera above the floor and distance of display from camera), and orientation (e.g., camera angle). In some embodiments characteristics of the lens (e.g., field of view, and focal length), and the image sensor can be used in the frustum calculation. The images of the virtual environment generated within the frustum of the camera can be generated from the tracked position and perspective of the camera.

The method can include images of the virtual environment outside of the frustum of the camera are generated from a global-view perspective that is different from the perspective of a taking camera. In some embodiments, the global-view perspective is rendered from a virtual spherical camera placed at a virtual location in the virtual environment.

In various embodiments, the images of the virtual environment presented on the one or more displays are updated by rendering a global-view of the virtual environment. The method can include rendering a perspective-correct view of the virtual environment from a location and perspective of the camera for an area of the one or more displays within the frustum of the camera. The method can include combining the global-view rendering with the perspective-correct view rendering such that portions of the virtual environment outside the frustum of the camera are from the global-view render and portions of the virtual environment within the frustum of the camera are from the perspective-correct view render.

In various embodiments, the method includes rendering a plurality of virtual lights at different positions on the one or more displays separately from the global-view and perspective-correct renders and adding the rendered virtual lights after combining the global-view and perspective-correct renders so as to preserve the plurality of virtual lights in situations. In this way the perspective-correct render would otherwise over-write one more of the plurality of virtual lights.

In various embodiments, the method further includes generating video content from a performance performed on a stage that is at least partially surrounded by one or more displays. The method can include presenting images of a virtual environment on the one or me displays surrounding a performance area to create an immersive environment around the performance area. The method can include capturing a plurality of images of the performer and portions of the virtual environment with a camera. The method can include tracking movement of the camera during the performance. The method can include generating video content based on the plurality of captured images. The images of the virtual environment can be presented on the one or more displays within a frustum of the camera are generated from a first render from a location and perspective of the camera that changes based on movement of the camera and images of the virtual environment outside the frustum of the camera are generated from a second render from a global-view perspective that does not change based on movement of the camera.

In various embodiments, the second render can be generated from a virtual spherical camera placed at a virtual location in the virtual environment.

In various embodiments, images of the virtual environment can be presented onto the one or more display screens by overlaying the first render onto the second render. In some embodiments the render from the location and perspective of the camera covers an entirety of the virtual environment within the frustum of the camera along with a border region that surrounds the frustum of the camera. The method can include a blending technique to combine the render from the location and perspective of the camera with the render from the global-view perspective in the border region.

In various embodiments, the method can include lighting the performance area with one or more simulated lights displayed on the one or more displays. The method can include a third render in which the one or more simulated lights are rendered from a global-view separately from the first and second renders.

In various embodiments, images of the virtual environment are presented onto the one or more display screens by overlaying the third render onto the combination of the first and second renders.

In one aspect, an immersive content presentation system can include one or more processors and one or more memory devices comprising instructions that, when executed by the one or more processors, cause the one or more processors to perform operations. The operations can include capturing a plurality of images of a performer performing in a performance area using a camera. The performer can be at least partially surrounded by one or more displays presenting images of a virtual environment, where the images of the virtual environment within a frustum of the camera are updated on the one or more displays based on movement of the camera. The images of the virtual environment outside of the frustum of the camera are not updated based on movement of the camera. The immersive content presentation can include generating content based on the plurality of captured images.

In various embodiments, the system can execute instructions that, when executed by the one or more processors, cause the one or more processors to track the position of the camera within the performance area render images of the virtual environment in portions of the one or more displays within the frustum of the camera from the tracked position and perspective of the camera. The images of the virtual environment outside of the frustum of the camera are generated from a global-view perspective rendered from a virtual spherical camera placed at a virtual location in the virtual environment.

In various embodiments, the system can include a light emitting diode (LED) display comprising of one or more diodes that are positioned according to a stochastic sampling pattern.

In various embodiments, the system can include a light emitting diode (LED) display comprising a translucent layer formed over the light emitting diodes.

In one aspect, a non-transitory, computer-readable medium comprising instructions that, when executed by one or more processors, cause the one or more processors to perform operations. The operations can include capturing a plurality of images of a performer performing in a performance area using a camera, wherein the performer is at least partially surrounded by one or more displays presenting images of a virtual environment. The images of the virtual environment within a frustum of the camera can be updated on the one or more displays based on movement of the camera, and images of the virtual environment outside of the frustum of the camera are not updated based on movement of the camera. The system can perform operations that include generating content based on the plurality of captured images.

In various embodiments, the non-transitory, computer-readable medium can include instructions that, when executed by one or more processors, cause the one or more processors to track the position of the camera within the performance area render images of the virtual environment in portions of the one or more displays within the frustum of the camera from the tracked position and perspective of the camera.

In various embodiments, images of the virtual environment outside of the frustum of the camera are generated from a global-view perspective rendered from a virtual spherical camera placed at a virtual location in the virtual environment.

In one aspect, the techniques include a computer-implemented method of generating content. The method can include generating and presenting images of a virtual environment on one or more displays at least partially surrounding a performance area at a first frame rate. The method can include capturing a plurality of images of a performer performing in the performance area along with at least some portion of the images of the virtual environment by a first taking camera and a second taking camera wherein each of the first and second taking cameras are set to capture images at frame rate equal to half the first frame rate and the first taking camera is set to capture images on even frames and the second taking camera is set to capture images on odd frames. For each of the first and second taking cameras, images of the virtual environment within a frustum of the first and second cameras can be updated on the one or more displays in the generating and presenting step based on movement of the first and second taking cameras. Images of the virtual environment outside of the frustum of the first and second taking cameras are not updated based on movement of the first and second taking cameras. The method can include generating content based on the plurality of captured images.

In various embodiments, the method further includes capturing images of the virtual environment using a spherical camera.

In various embodiments, the method further includes tracking a first position of the first taking camera and a second position of the second taking camera within the performance area. The images of the virtual environment generated within the frustum of the first taking camera and the second taking camera are generated from the tracked position and perspective of the first taking camera and the second taking camera.

In various embodiments, images of the virtual environment outside of the frustum of the first taking camera and the second taking camera are generated from a global-view perspective that is different from the perspective of the first taking camera and the second taking camera.

In various embodiments, the images of the virtual environment presented on the one or more displays are updated by: rendering a global-view perspective of the virtual environment; rendering a first perspective-correct view of the virtual environment from a location and perspective of the first taking camera for an area of the one or more displays within the frustum of the first taking camera; rendering a second perspective-correct view of the virtual environment from a location and perspective of the second taking camera for an area of the one or more displays within the frustum of the second taking camera; and combining the global-view rendering with the first perspective-correct view rendering and second perspective-correct view rendering such that portions of the virtual environment outside the frustums of the first taking camera and the second taking camera are from the global-view render and portions of the virtual environment within the frustum of the first taking camera and the second taking camera are from the perspective-correct view render.

In various embodiments, the method includes rendering a plurality of virtual lights at different positions on the one or more displays separately from the global-view and perspective-correct renders and adding the rendered virtual lights after combining the global-view and perspective-correct renders so as to preserve the plurality of virtual lights in situations where the perspective-correct render would otherwise over-write one more of the plurality of virtual lights.

In various embodiments, a blending technique can be used to combine the render from the location and perspective of the first taking camera and the second taking camera with the render from the global-view perspective in a border region.

In various embodiments, the method can further include tracking a motion or a position of the performer by tracking movement of the first taking camera and the second taking camera.

In an aspect, the technique can include a computer-implemented method of generating content. The method can include generating and presenting images of a virtual environment on one or more displays at least partially surrounding a performance area at a first frame rate. The method can include capturing a plurality of images of a performer performing in the performance area along with at least some portion of the images of the virtual environment by N taking cameras where N is an integer greater than one and each of the N taking cameras is set to capture images at frame rate equal to the first frame rate divided by N. For each of the N taking cameras, images of the virtual environment within a frustum of the camera can be updated on the one or more displays in the generating and presenting step based on movement of the taking camera, and images of the virtual environment outside of the frustum of the camera are not updated based on movement of the taking camera. The method can include generating content based on the plurality of captured images.

In various embodiments, the method can further include rendering a plurality of virtual lights at different positions on the one or more displays separately from a global-view and perspective-correct renders and adding the rendered virtual lights after combining the global-view and perspective-correct renders so as to preserve the plurality of virtual lights in situations where the perspective-correct renders would otherwise over-write one more of the plurality of virtual lights.

In various embodiments, a blending technique can be used to combine renders from a location and a perspective of the N taking cameras with a render from a global-view perspective in a border region.

In various embodiments, the method can include capturing images of the virtual environment using a spherical camera.

In one aspect, an immersive content presentation system can include one or more processors; and one or more memory devices comprising instructions that, when executed by the one or more processors, cause the one or more processors to perform operations. The operations can include generating and presenting images of a virtual environment on one or more displays at least partially surrounding a performance area at a first frame rate; and capturing a plurality of images of a performer performing in the performance area along with at least some portion of the images of the virtual environment by a first taking camera and a second taking camera wherein each of the first and second taking cameras are set to capture images at frame rate equal to half the first frame rate and the first taking camera is set to capture images on even frames and the second taking camera is set to capture images on odd frames. For each of the first and second taking cameras, images of the virtual environment within a frustum of the camera can be updated on the one or more displays in the generating and presenting step based on movement of the taking camera, and images of the virtual environment outside of the frustum of the camera are not updated based on movement of the taking camera. The operations can include generating content based on the plurality of captured images.

In various embodiments, the instructions can cause the one or more processors to perform operations comprising capturing images of the virtual environment using a spherical camera.

In various embodiments, the instructions can cause the one or more processors to perform operations comprising tracking a first position of the first taking camera and a second position of the second taking camera within the performance area and wherein images of the virtual environment generated within the frustum of the first taking camera and the second taking camera are generated from the tracked position and perspective of the first taking camera and the second taking camera.

In various embodiments, images of the virtual environment outside of the frustum of the first taking camera and the second taking camera are generated from a global-view perspective that is different from the perspective of the first taking camera and the second taking camera.

In various embodiments, images of the virtual environment presented on the one or more displays are updated by: rendering a global-view perspective of the virtual environment; rendering a first perspective-correct view of the virtual environment from a location and perspective of the first taking camera for an area of the one or more displays within the frustum of the first taking camera; rendering a second perspective-correct view of the virtual environment from a location and perspective of the second taking camera for an area of the one or more displays within the frustum of the second taking camera; and combining the global-view rendering with the first perspective-correct view rendering and second perspective-correct view rendering such that portions of the virtual environment outside the frustums of the first taking camera and the second taking camera are from the global-view render and portions of the virtual environment within the frustum of the first taking camera and the second taking camera are from the perspective-correct view render.

In one aspect, a non-transitory computer-readable medium comprising instructions that, when executed by one or more processors, cause the one or more processors to perform operations comprising: generate and present images of a virtual environment on one or more displays at least partially surrounding a performance area at a first frame rate; and capture a plurality of images of a performer performing in the performance area along with at least some portion of the images of the virtual environment by a first taking camera and a second taking camera wherein each of the first and second taking cameras are set to capture images at frame rate equal to half the first frame rate and the first taking camera is set to capture images on even frames and the second taking camera is set to capture images on odd frames.

For each of the first and second taking cameras, images of the virtual environment within a frustum of the camera can be updated on the one or more displays in the generate and present step based on movement of the taking camera, and images of the virtual environment outside of the frustum of the camera are not updated based on movement of the taking camera. The operations can generate content based on the plurality of captured images.

In various embodiments, the non-transitory, computer-readable medium of claim can include instructions that, when executed by one or more processors, cause the one or more processors to capture images of the virtual environment using a spherical camera.

In various embodiments, the instructions that, when executed by one or more processors, cause the one or more processors to track a first position of the first taking camera and a second position of the second taking camera within the performance area and wherein images of the virtual environment generated within the frustum of the first taking camera and the second taking camera are generated from the tracked position and perspective of the first taking camera and the second taking camera.

To better understand the nature and advantages of the present invention reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Embodiments of the invention are directed at an immersive content production system. For example, immersive content (e.g., virtual reality content, mixed reality content, augmented reality content, etc.) can be leveraged as part of a system used by users (e.g., artists, engineers, technicians, directors, and other individuals involved in content production) in order to generate content (e.g., movies, television programming, online or streamed videos, etc.).

Figure 1:
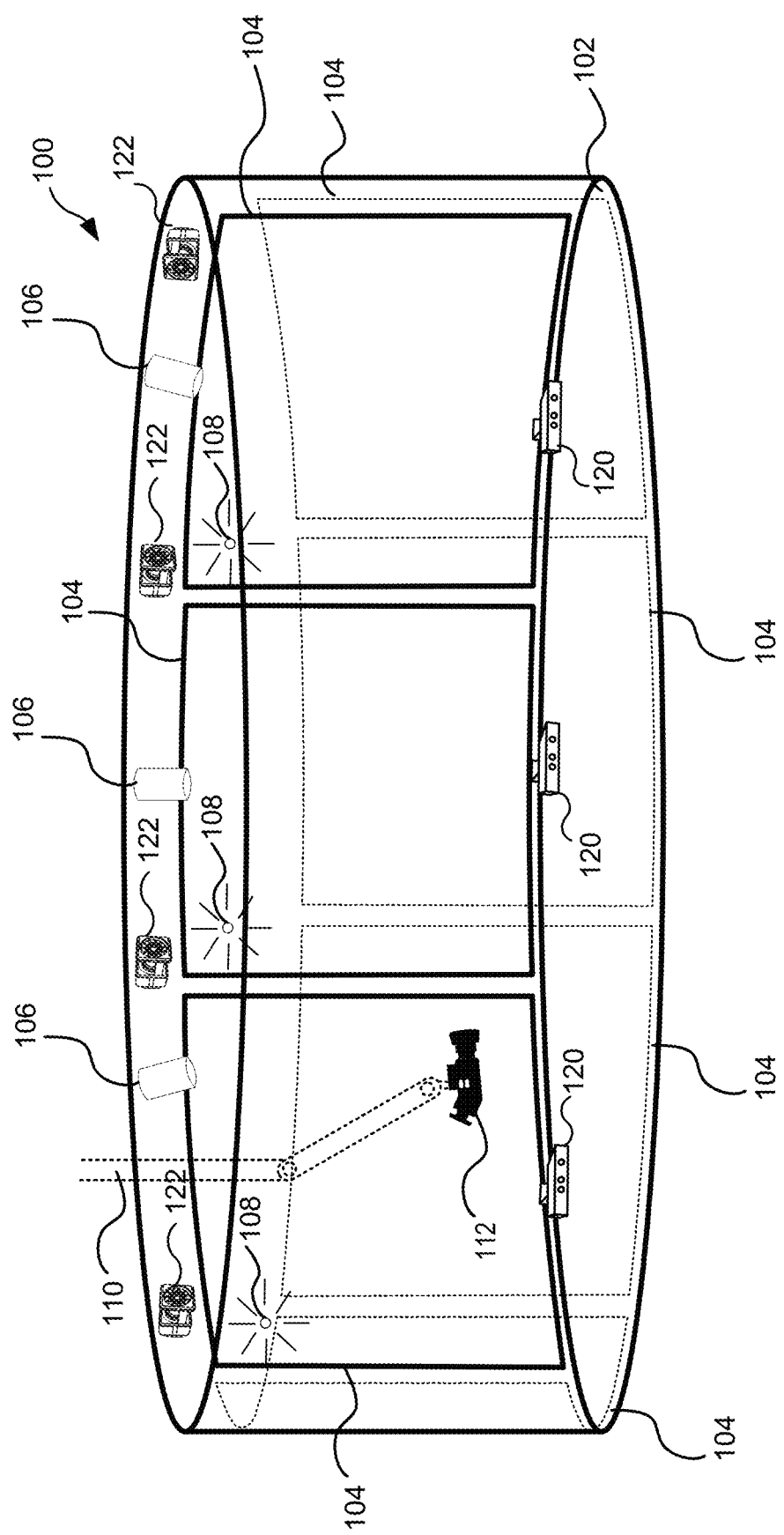
FIG. 1 illustrates an immersive content production system according to some embodiments of the invention.

In order to better understand and appreciate aspects of the invention, reference is made to FIG. 1, which is a simplified illustration of an immersive content production system 100 according to an embodiment of the invention. Immersive content production system 100 can include a performance area 102 that is partially or completely surrounded by image displays 104 (sometimes referred to herein as just "displays"). Content production system 100 can obtain virtual environment content and display the virtual environment content on the displays 104.

Performance area 102 can be, for example, a movie or television set, a stage, a stadium, a park, or the like. In one aspect, the immersive content production system 100 presents images in real-time or at interactive frame rates to users of the content production system (e.g., performers within performance area 102). Since the displays 104 surround or partially surround performance area 102, content production system 100 can create an immersive environment (sometimes referred to as an immersive "cave" or immersive "walls") for performances that take place within the performance area. In this way, an actor or actress performing within performance area 102 can appear to be in the virtual environment.

In some embodiments, displays 104 are light emitting diode (LED) display screens or liquid crystal display (LCD) display screens. For example, the performance area 102 can include one or more walls of LED or LCD displays 104 enclosing the performance area 102. Alternatively, the performance area 102 can be partially or completely surrounded by projector screens and a set of projectors can be configured to project images on the projector screens. In some embodiments, the performance area 102 can be surrounded by a combination of LED display screens, LCD display screens and/or projector screens.

Embodiments of the invention are not limited to any particular size of the displays 104 or stage 102. In some embodiments the displays can be 20-40 feet tall and the performance area 102 can be, for example, between 50-100 feet in diameter. In some embodiments, the displays 104 can include multiple displays 104 that are generally fixed in position and mostly surround the performance area along with additional moveable or mobile displays 104 that can be moved into positions that create an immersive environment that extends completely or almost completely (i.e., 300-360 degrees) around performance area 102. As an example, in one embodiment fixed position displays 104 can extend approximately 270 degrees around performance area 102 while moveable displays 104 can be used to augment the fixed position displays to further extend the immersive environment up to 320 degrees or up to 360 degrees around the performance area. Additionally, while not shown in FIG. 1, in some embodiments, content production system 100 can further include one or more displays 104 as a ceiling on performance area 102 and/or as part of the floor of the performance area. Also, while for ease of illustration, the displays 104 are shown in FIG. 1 as having a small space or gap 105 between them, the displays 104 can be installed in the immersive environment 100 as to be seamless with less than a threshold distance or even no space between adjacent displays.

A taking camera 112 can be attached to a rig 110 and can be aimed at the performance area 102 to capture the performance of a performer as well as the virtual environment displayed by the displays 104. In some embodiments, sensors can be used to determine the position and orientation of the taking camera during a performance. For example, GPS based sensors (not shown) can be attached to the taking camera to determine its position within or relative to the performance area. As another example, other cameras (e.g., motion capture cameras 122 discussed below) can be directed at the taking camera configured to capture the performance and one or more markers can be attached to the taking camera. During a performance, the other cameras can capture images of the taking camera as the taking camera is moved and/or oriented during the performance. The production system can use the images captured of the taking camera to determine the movement and orientation of the taking camera during the performance. Such information can be used to support the content production process. For example, such information regarding the orientation and movement of the taking camera can be used to determine the distance of the taking camera from the performer over a performance. Based on the orientation and movement (and other attributes such as lens aperture and focal length) of the taking camera, the content production system can adjust the virtual environment displayed by the immersive cave or walls in real-time or at interactive frame rates to correspond to orientation and position of the taking camera. In this way, images of the virtual environment can be perspective-correct over a performance of the performer.

In some embodiments, the immersive cave or walls can include one more lighting elements to provide lighting for performance area 102. For example, the immersive cave or walls can include supplemental LED lights 106 separate from displays 104 that can light the performance area 102 (including the performer) and create various desired lighting effects. Thus, the lights 106 can include the ability to project lighting levels of different intensities and project such light from different locations around the stage. In some embodiments the additional LED lights 106 can be controlled during a performance in order to change the intensity of the lighting of performance area 102 (including the performer).

In some embodiments, the additional lighting elements can be created within one or more portions of the various displays 104 that create the virtual environment. For example, instead of depicting the virtual environment in a portion of one or more of the displays 104 surrounding the performance area, that portion of the display 104 can simulate an LED light 108 that illuminates the performance area. Content production system can include multiple simulated lights 108 the location of each of which on the displays 104 can be selected in order to achieve a desired lighting effect.

The selection and placement of simulated lights 108 can be made by a director, lighting technician or other user of content production system 100 prior to a performance taking place within performance area 102 and being filmed by taking camera 112, but the number and location of the simulated lights can be readily adjusted at any time during the performance.

Since each simulated light 108 is created by the displays 104 and are thus part of the displays 104, such simulated lights are sometimes referred to as "embedded lights" or "virtual lights". The simulated lights 108 can be in addition to or instead of the supplemental lights, such as lights 106. Thus, in some embodiments, immersive content system 100 includes simulated lights 108 without any lights 106. Additionally, in some embodiments the taking camera(s) and/or the associated camera rigs capturing images of the performance area do not include any attached lights. For example, in some embodiments the taking camera 112 used to capture action within the performance area 102 does not include a ring of LED lights or other form of light for illuminating the performance area that might otherwise be used with such cameras.

In some embodiments, content production system 100 can further include one or more depth sensors 120 and/or one or more motion capture cameras 122. During a performance performed within the performance area 102, content production system 100 can detect the motion and/or positioning of one or more performers within the performance area. Such detection can be based on markers or sensors worn by a performer as well as by depth and/or other motion detection sensors 120 and/or by motion capture cameras 122. For example, an array of depth sensors 120 can be positioned in proximity to and directed at the performance area 102. For instance, the depth sensors 120 can surround the perimeter of the performance area. In some embodiments, the depth sensors 120 measure the depth of different parts of a performer in performance area 102 over the duration of a performance. The depth information can then be stored and used by the content production system to determine the positioning of the performer over the course of the performance.

Depth sensors 120 can include a motion-sensing input device with a depth sensor 120. The depth sensor 120 can include a monochrome complementary metal-oxide semiconductor (CMOS) sensor and infrared projector. The infrared projector can project infrared light throughout the first performance area 102, and the CMOS sensor can measure the distance of each point of reflected infrared (IR) radiation in the performance area 102 by measuring a time it takes for the emitted infrared light to return to the CMOS sensor. Software in the depth sensors 120 can process the IR information received from the depth sensor 120 and use an artificial intelligence machine-learning algorithm to map the visual data and create three-dimensional (3-D) depth models of solid objects in the first performance area 102. For example, the one or more depth sensors 120 can receive emitted infrared radiation to generate 3-D depth models of a performer, along with the floor, walls, and/or ceiling of the first performance area 102. In one test embodiment, the first performance area 102 was surrounded by six to eight Kinect® cameras to capture depth information of objects and performers in the first performance area 102.

Motion cameras 122 can be part of a motion capture system that can track the movement of performers or objects within system 100. In some instances, motion cameras 122 can be used to track the movement of the taking camera 112 and provide a location of the taking camera to content production system 100 as part of the process that determines what portion of displays 104 are rendered from the tracked position of and the perspective of the taking camera.

Figure 2:
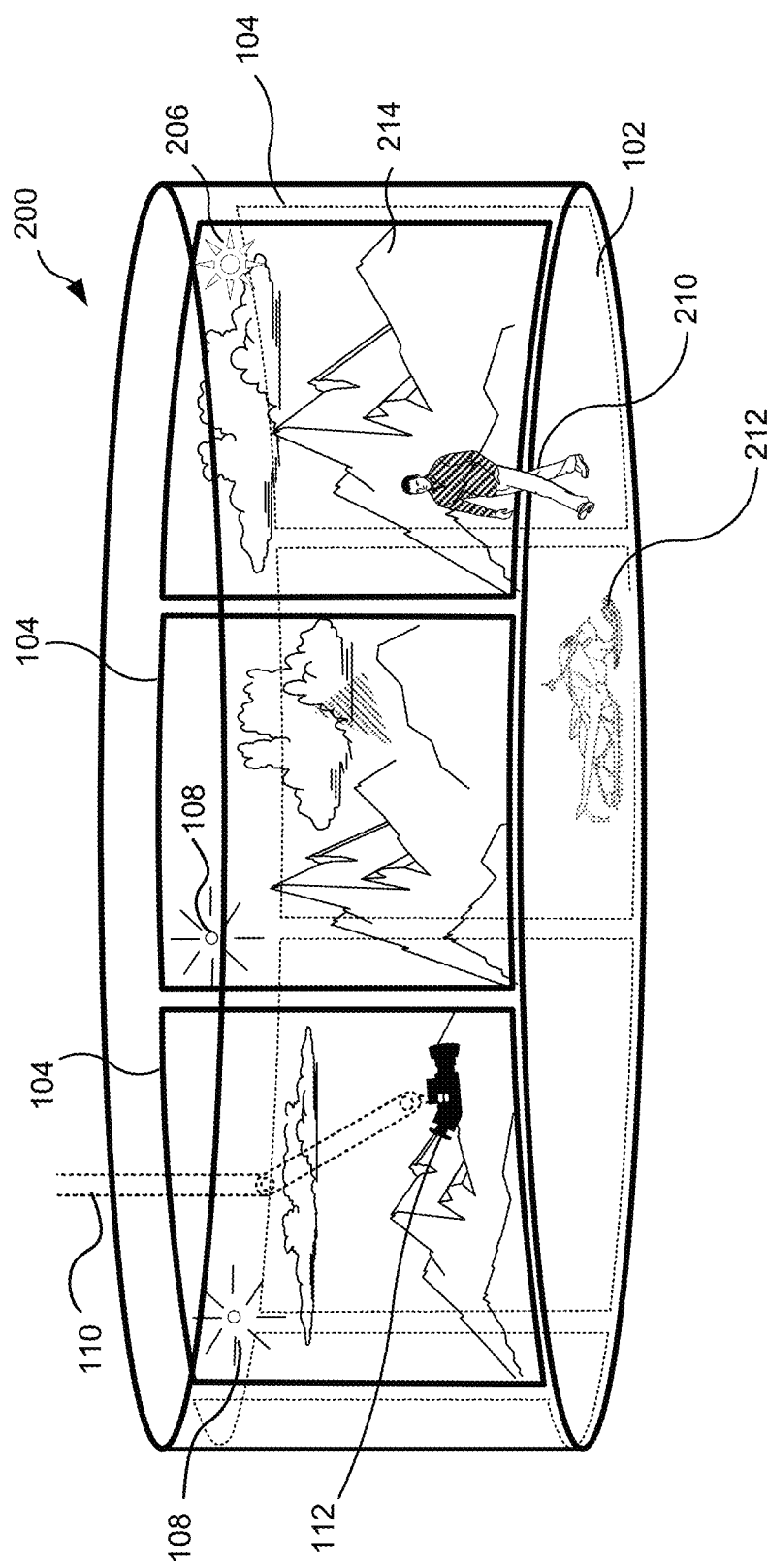
FIG. 2 illustrates an immersive content production system according to some embodiments of the invention with a performer on the stage and scenery depicted on the image displays.

FIG. 2 is a simplified illustration of an immersive content production system 200 according to an embodiment of the invention that can be similar or identical to immersive content production system 100 and thus includes many or all of the same components as described with respect to FIG. 1. As shown in FIG. 2, content production system 200 includes performance area 102, displays 104, simulated lights 108 and a taking camera 112 attached to rig 110, but does not include depth sensors 120 or motion cameras 122.

A performer 210 is also shown within performance area 102 and the performance area can include one or more props 212 (e.g., the snowmobile depicted in FIG. 2.). Scenery images 214 of the virtual environment can be presented on the displays 104 to generate the immersive environment in which performer 210 can conduct his or her performance (e.g., act out a scene in a movie being produced). In some embodiments, the scenery images 214 can be seamlessly presented across several displays 104 as described with respect to FIG. 1. Scenery images 214 can include one or more virtual light sources 206 that can be, for example, an image of a sun, a moon, stars, street lights, or other natural or manmade light sources displayed in the scenery images 214.

Scenery images 214 can also provide background for the video content captured by a taking camera 112 (e.g., a visible light camera). Taking camera 112 can capture a view of performance area 202 from a single perspective. In some embodiments, the taking camera 112 can be stationary, while in other embodiments, the taking camera 112 can be mounted to a track 110 that can move the taking camera during the performance.

Embodiments of the invention can generate and display perspective-correct images (as rendered from the tracked position and perspective of taking camera 112) onto portions of the surrounding image display walls that are within the field of view (i.e., the frustum) of the taking camera. Areas of the displays 104 outside the field of view of taking camera 112 can be displayed according to a global view perspective. Further details of associated with generating and displaying content on displays 104 according to two different perspectives in accordance with some embodiments of the invention are discussed below.

Figure 3:
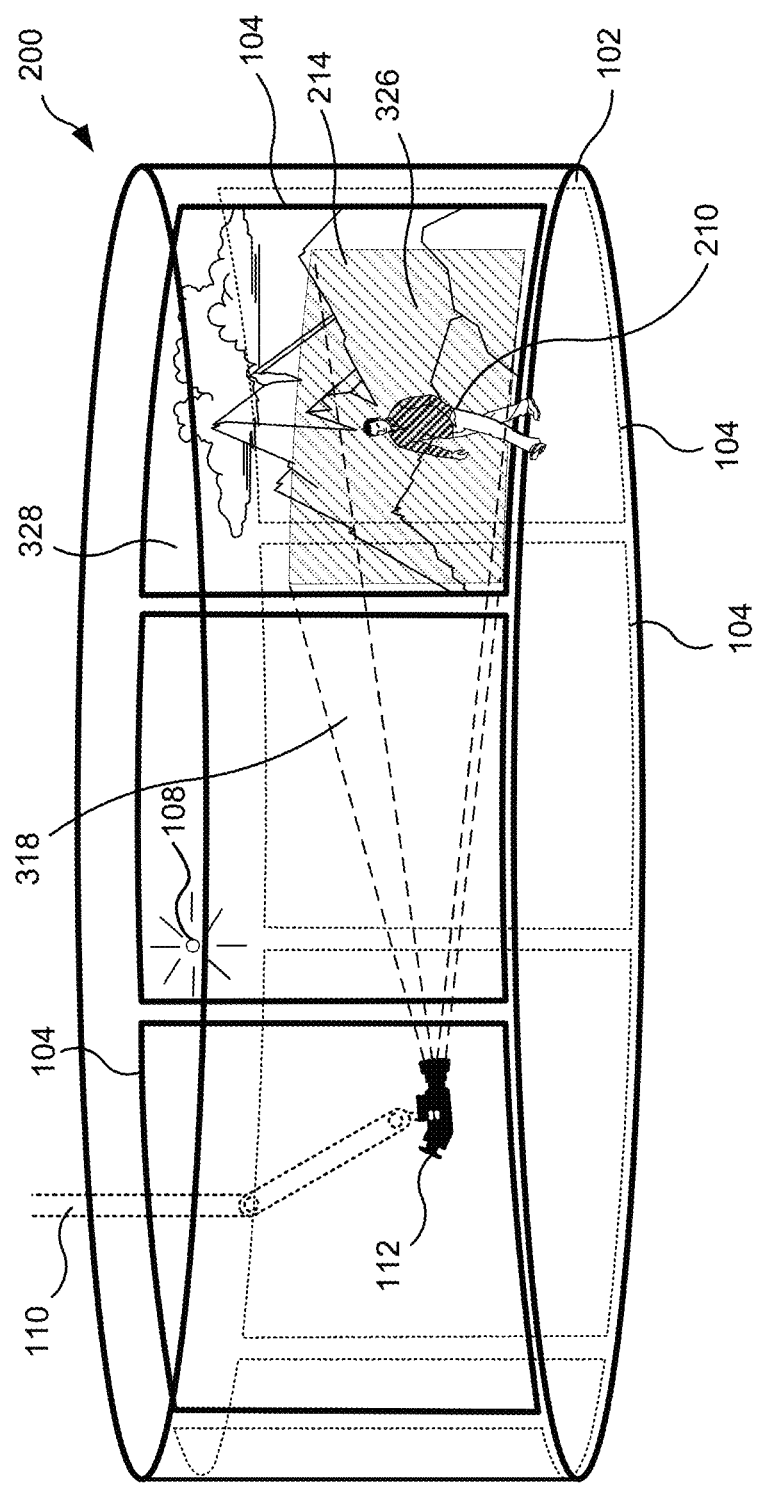
FIG. 3 illustrates an example of the frustum of a taking camera within the immersive content production system shown in FIG. 2.
Figure 4:
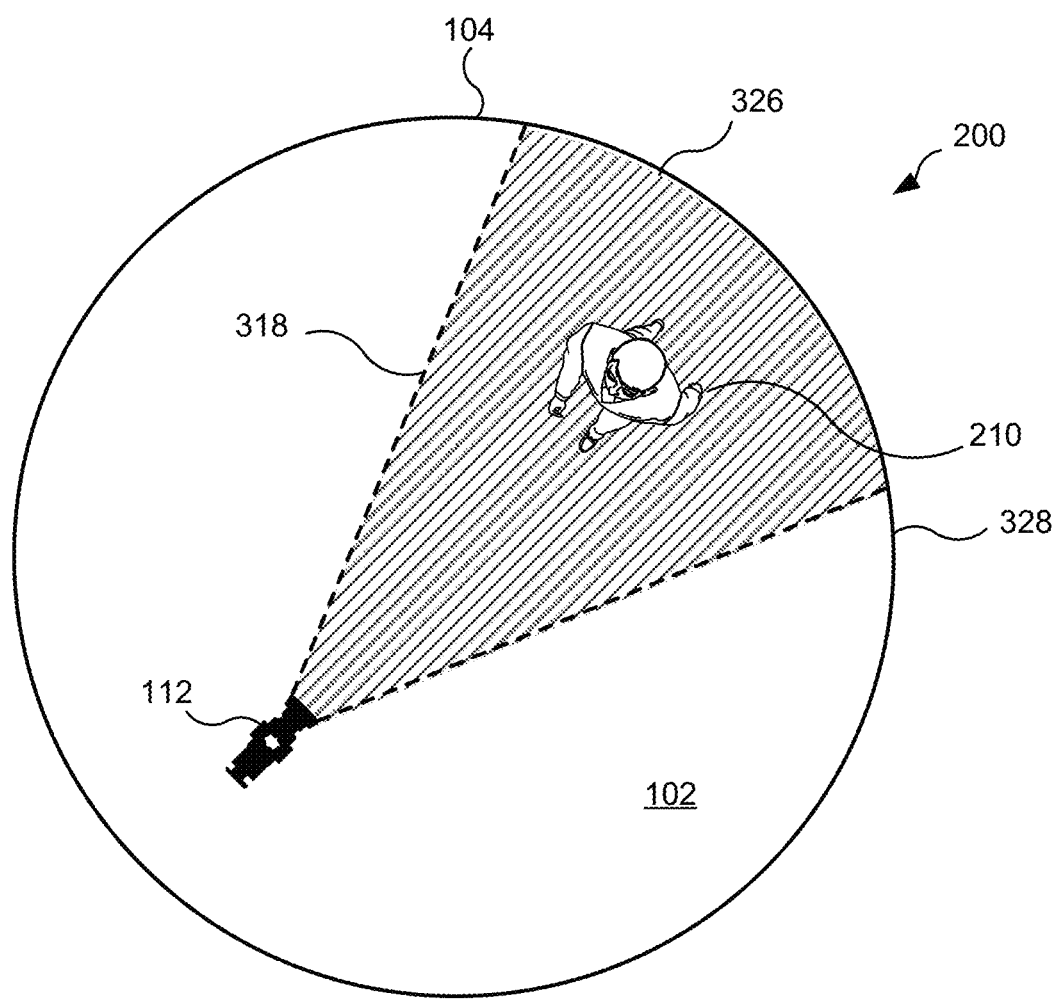
FIG. 4 is a simplified illustration of the immersive content production system shown in FIG. 3 depicting the frustum of the taking camera from a top view.

FIG. 3 is a simplified drawing of immersive environment production system 200 from FIG. 2 and FIG. 4 is a simplified top view of production system 200. Shown in each of FIGS. 3 and 4 is a frustum 318 of taking camera 112 within the content production system. For three-dimensional (3D) graphics, the frustum of a camera, also known as a viewing frustum, can be the region of space in the modeled world that would appear on video taken from the camera. Thus, the frustum 318 is the field of view of the camera 112. The exact shape of viewing frustum 318 can vary and will depend on the lens of camera 112 but typically it is a frustum of a rectangular pyramid (hence the name).

In creating the immersive environment presented on displays 104, immersive content production system 200 can render the portion within the frustum of the taking camera differently than it renders the portion outside the frustum of the taking camera. For example, embodiments of the invention can render the portion 326 of the displays 104 that corresponds to frustum 318 as perspective-correct images that can update based on movement of the taking camera 112. For example, taking camera 112 can move during a performance as performer 210 moves or to capture the performer from a different angle. As the taking camera 112 moves, portions of the scenery images 214 within the viewing frustum 318 can be updated in accordance with the perspective of the camera. Portion 328 of the displays 104 outside of the frustum 318 can be rendered from a global view perspective and thus display relatively static images that do not change based on the movement of the taking camera.

In some embodiments, the images inside the frustum of the taking camera 112 can be at a higher resolution than the images outside the frustum. In some embodiments, the images displayed outside the frustum of the camera can be relatively basic scenery images (e.g., blue sky, green grass, gray sea, or brown dirt.) In some instances the scenery images can be completely static. In other instances the scenery images 214 can dynamically change over time providing a more realistic background for the performance in the immersive environment 200. For example, clouds can move slowly across the displays 104, branches of trees can blow in the wind, etc. to create realistic, life-like effects. Further, the scenery images 214 can dynamically change over time to represent changes in the environment over time.

If the entirety of scenery 214 is rendered from the tracked position and perspective of the taking camera 112 to present perspective-correct images across the entirety of surrounding displays 104, in some instances view-dependent lighting artifacts will be present on the physical foreground components within the performance area 102 (e.g., the performers/actors, props, and physical set decorations). As the taking camera 112 moves, the rendered images on the displays 104 update, which can result in a visual discrepancy between the static physical set in the performance area 102 and the virtual assets of the virtual environment rendered by displays 104 on the walls. As a result, light sources (e.g., virtual sun 206) within the virtual environment might appear to move across the performers 210, across the props 212, and/or across various set decorations, just because the taking camera 112 is physically moving. Thus, it might appear that virtual sun 206 moves relative to a performer based on movement of the taking camera when in fact the position of virtual sun 206 relative to the performer should not change.

Figure 5:
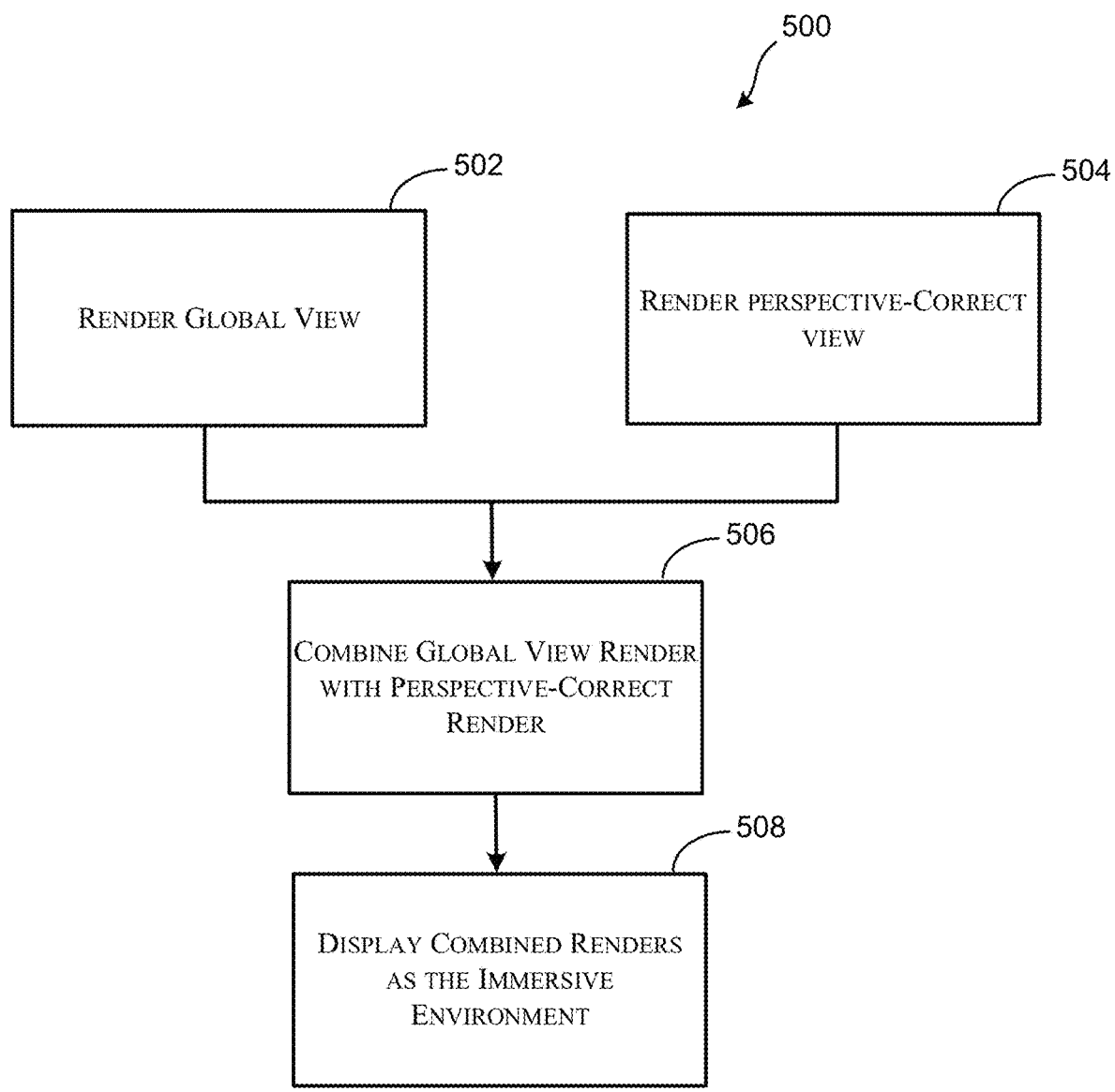
FIG. 5 illustrates a flow diagram for an exemplary method of rendering images using an immersive content production system.

To mitigate this visual artifact, two separate renderings can be performed in some instances by the content production system of embodiments of the invention when displaying a virtual environment. As shown in FIG. 5, which is a flowchart depicting a method of rendering content onto the displays 104 according to some embodiments of the invention, the two renderings can be performed simultaneously and in real-time. In one rendering (block 502), a global view of the virtual environment (including any virtual assets) is rendered independent from the perspective of the taking camera. The global view can include background or scenery images that create much of the virtual or immersive environment that provides context for the one or more performers on stage 102. The global view can also include lighting effects produced from displays outside the frustum of the taking camera 112. Depending on the size of frustum 318, this global view rendering can be displayed on the majority of the display area within the virtual environment.

Block 502 can render the global view from a virtual spherical camera placed at a virtual location within the virtual environment based on predefined criteria. In some embodiments, the placement of the virtual spherical camera can be based on a threshold error value for the lighting of virtual objects within the virtual environment and/or lighting of the physical objects in the performance area. The threshold error value can indicate a minimal acceptable level of visual inaccuracy of the lighting of the objects within the virtual environment and/or performance area. In some embodiments, the images of the virtual environment rendered by in the global-view rendering can remain completely static. In other words, objects within the virtual environment might not move or change in location on the displays 104 over time or during a performance. In other embodiments, objects within the global-view of the virtual environment are not completely static but simply do not update in response to movement of the taking camera 112. Images of the virtual environment generated during the global-view rendering can be used for lighting and reflection purposes onto the physical foreground/performance area.

In another rendering (block 504), a portion of the virtual environment is rendered from the location and perspective of the taking camera. The perspective-correct rendering can be completely independent from the global-view render and can include performers, props and background scenery within the frustum (e.g., frustum 318) of the taking camera 112. The perspective-correct rendering (block 504) represents a portion of the virtual environment and can thought of as a patch that can be displayed on a portion of displays 104. As the global view can be captured by a virtual spherical camera, discrepancies can exist for images displayed on the displays in the background from the spherical camera as compared with images that captured within the frustum of the taking camera. Therefore, a patch can be created to correct the images in the background displays that appear within the frustum of the taking camera. In this way as the taking camera captures the one or more images with actors, props, and background, the background appears to be perspective-correct and do not move abnormally due to movement of the taking camera.

Embodiments of the invention can combine the patch from the perspective-correct rendering with the global-view render (block 506) to present the virtual environment on the content production system without (or with fewer) undesirable lighting effects (block 508). For example, images of the virtual environment can be generated onto displays 104 and updated over the course of a performance so that the perspective of the virtual environment displayed compensates for corresponding changes to the positioning and orientation of the taking camera 112. In some embodiments, rendered content is combined (block 506) such that the displays 104 display (block 508) the perspective-correct rendering in the portion of the displays 104 that is viewable by the frustum 318 of the taking camera 112 and the portions of the displays 104 outside of the frustum 318 of the taking camera 112 only include the rendered images from the global-view render.

Content can be presented and continuously updated on the displays 104 in the manner set forth in FIG. 5 throughout the duration of a performance. As the position of the taking camera 112 changes during the performance (or as other factors that alter the field of view of the taking camera, such as the focal length of the lens, change), the area 326 that is rendered from the perspective and location of the taking camera during the performance (block 504) will change.

In some embodiments the immersive content generated in block 506 and displayed in block 508 can be done so at a frame rate that matches the frame rate of taking camera 112, such as 48, 72 or 96 frames per second or other suitable frame rates compatible with the taking camera. And, as immersive content is presented and updated on the displays, taking camera 112 can film the performance at the frame rate generating video of one or more performers and/or props on the stage with the immersive content generated in block 506 and displayed per block 508 in the background. The generated video can then be used, and edited in some embodiments, to create new content, such as movies, television programming, online or streamed videos, etc.

As discussed, above the virtual environment can remain static for images of the global-view render. Limiting the perspective correct imagery to the frustum 318 of the camera 112 minimizes lighting and reflection artifacts from shifting perspectives as the camera 112 position changes during a performance. In some instances, as the taking camera 112 moves, different portions of the displays 104 will fall within the frustum 318 of the taking camera 112. As such, a particular portion of the displays 104 may display images rendered from the global-view or images rendered from the perspective-correct view depending on the position and orientation of the taking camera 112 at a given point during a performance.

Some embodiments of the invention combine the camera-perspective and global view renderings (block 506) using a technique that blurs or blends the edges of the patch generated in block 502 with the surrounding content generated in block 504. For example, in some embodiments block 504 renders a perspective-correct patch that is slightly larger than (i.e., over scanned) area 326. In block 506, embodiments of the invention replace the entirety of the global-view render that corresponds to area 326 with the patch generated in block 504 and a soft blending technique is used to combine content from the portion of the patch that is over-sized and overlaps with the global-view render in the overlapping area of the displays 104. Such a soft blending technique can reduce or eliminate visible discontinuities between the patch in area 326 generated from the perspective-correct render and images of the virtual environment surrounding the patch generated from the global-view render when the combined content is presented on displays 104 (block 508). Such a soft blending technique can result in having the edges of area 326 "fuzzy" to obfuscate differences between the images depicted in the patch and the images presented outside the patch. This technique can mitigate artifacts due to latency of camera tracking. For example, in some embodiments the frequency at which the system gets updates of the taking camera's position and orientation can run behind the rate at which the system can render digital content to displays 104. In such embodiments, operators can control the amount of over scanning. In other embodiments, a second camera can be used to fill in the over scanned areas.

In some embodiments, the method can include rendering the images of the virtual environment outside the frustum of the camera without correcting for movement of the camera. For example, in some embodiments content production system 200 can correct for undesirable lighting artifacts, such as those described above, through the use of high frame-rate synching by interleaving the perspective correct rendering on one series of frames with the global-view rendering on a separate series of frames. To reduce a potential strobe effect of the lighting that might be disruptive to the performers 210 in such embodiments, cameras with sufficiently high frame rates should be employed. For example, during high frame-rate synching techniques for an output to present images at 24 frames per second, embodiments that interlace the rendered content would require two cameras to capture images at 48 frames per second. If there are three cameras, each camera would need to capture images at 72 frames per second.

The use of simulated lights 108 in the displays 104 for lighting can lead to different challenges. For example, since the simulated lights 108 are rendered by software to be included in the displays 104, unless special steps are taken to preserve the simulated lights, the simulated lights can be cutout by the taking camera whenever the camera would face these lights on the wall due to the compositing order which places the camera frustum view on top of all other views. For example, if the simulated lights 108 are generated in the global-view rendering, the lights can be cut out in areas where the perspective-correct rendering overwrites the global-view rendering. Doing such effectively "turns off" any simulated light 108 that is within area 326 which, in turn, can undesirably change the lighting conditions on the performance stage 102.

Figure 6:
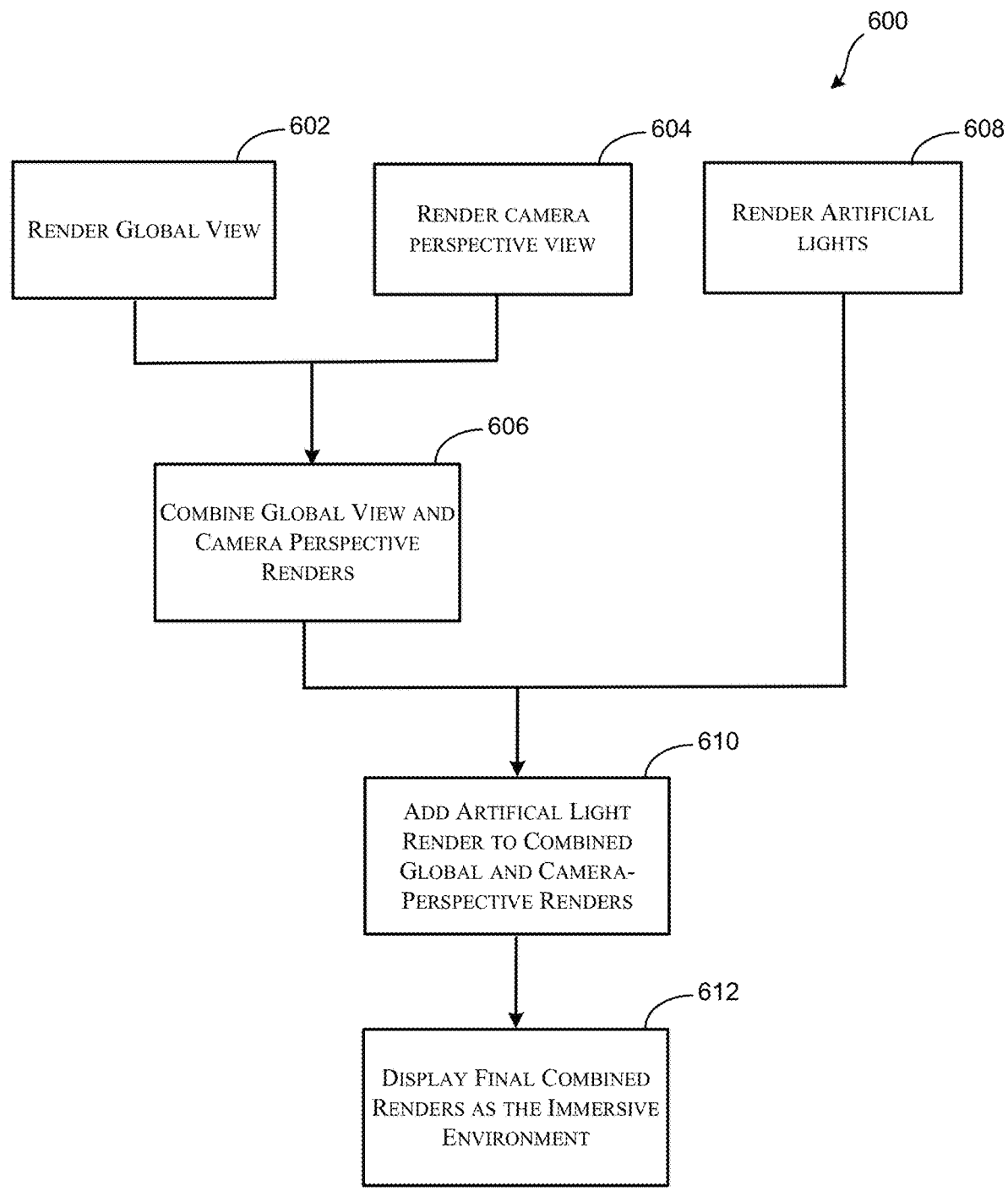
FIG. 6 illustrates a flow diagram for a method of capturing images using an immersive content production system using multiple taking cameras.

Some embodiments provide a solution to this problem by performing a third rendering step in which the simulated lights are rendered separately from the global-view render and separately from the perspective-correct render as shown in FIG. 6, which is a flowchart depicting a method of rendering content onto the displays 104 according to some embodiments of the invention. As shown in FIG. 6, method 600 performs a global-view render (block 602) and a camera-perspective render (block 604) and combines the two separate renderings into a composite view that includes content from the perspective-correct render overlaid onto the global-view render in the area 326 as described above (block 606). Blocks 602, 604 and 606 can be essentially identical to blocks 502, 504 and 506 described with respect to FIG. 5 and thus are not discussed in detail.

Method 600 further includes a third rendering step (block 608), however, in order to preserve the simulated lighting sources 108 embedded within displays 104. In this third rendering step, which can be referred to as an "artificial light render", the simulated lights 108 that can be placed at multiple locations across the displays 104 are rendered separately from the content rendered in blocks 602 and 604. In some embodiments only the lighting sources are rendered in this rendering step such that the completed render is transparent in all regions of the displays except the simulated lighting areas 108. Also, in some embodiments, the simulated lights 108 are not rendered at all in the global-view render (block 602). The order in which the three rendering steps 602, 604 and 608 are performed is not critical, and in some embodiments, rendering step 606 is performed simultaneous with, and in real time, with the global-view render (block 602) and the perspective-correct render (block 604) and in other embodiments can be performed after or before those rendering steps.

After the simulated lights 108 are rendered (block 608), the rendered lighting is overlaid onto the combined content generated by block 606 and defined by overlaying the perspective-correct view onto area 326 of the global-view to generate a composite view that includes details from all three renderings (block 610). Adding the lighting sources rendered in block 608 to the content from the global-view and perspective-correct renderings combined in block 606 after the content in block 606 is generated (block 610) can ensure that the perspective-correct rendering does not undesirably clip one or more of lighting sources. The content from the combined three separate rendering steps can then be presented on displays 104 (block 612).

Figure 7:
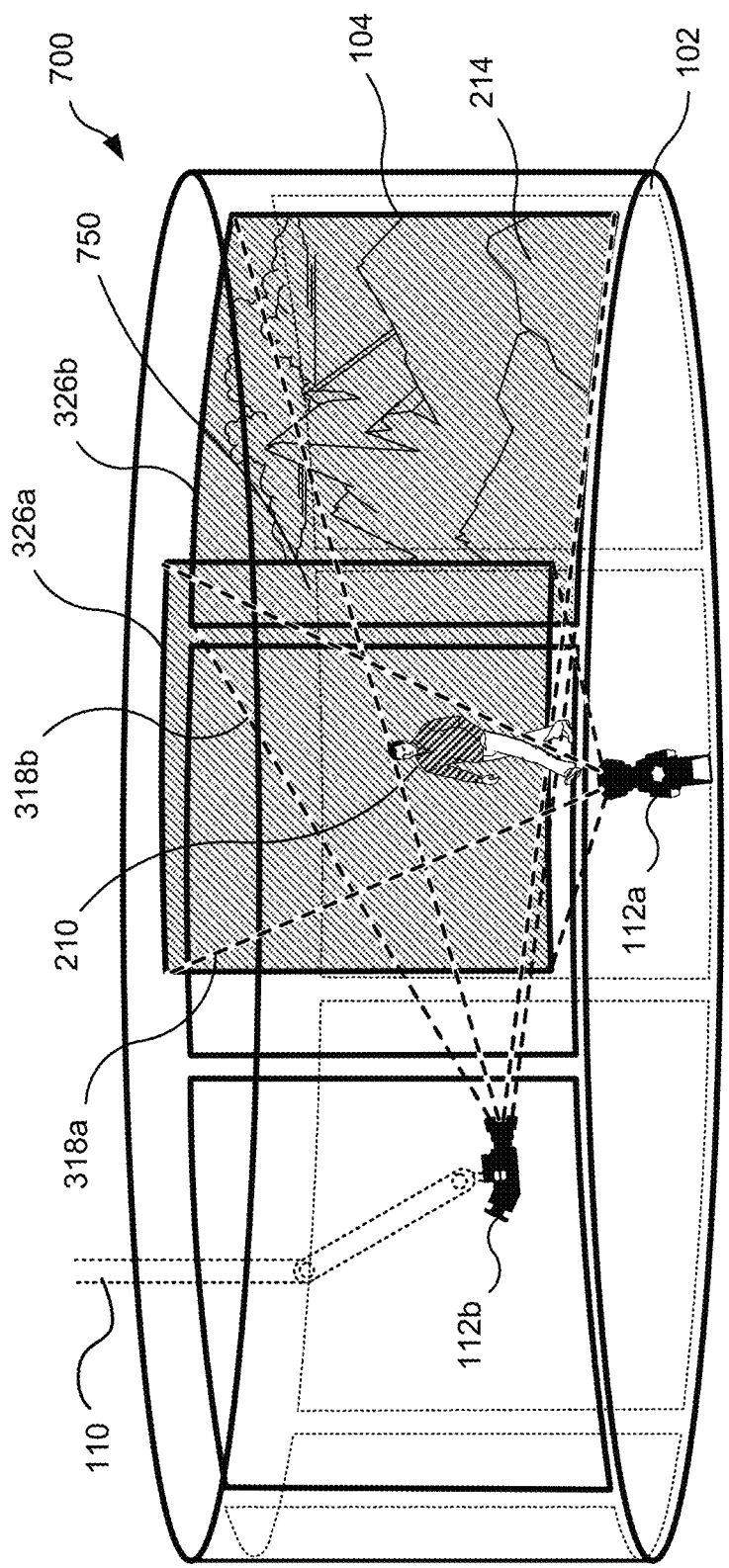
FIG. 7 illustrates an exemplary embodiment of an immersive content production system according to some embodiments of the invention that includes multiple taking cameras.
Figure 8:
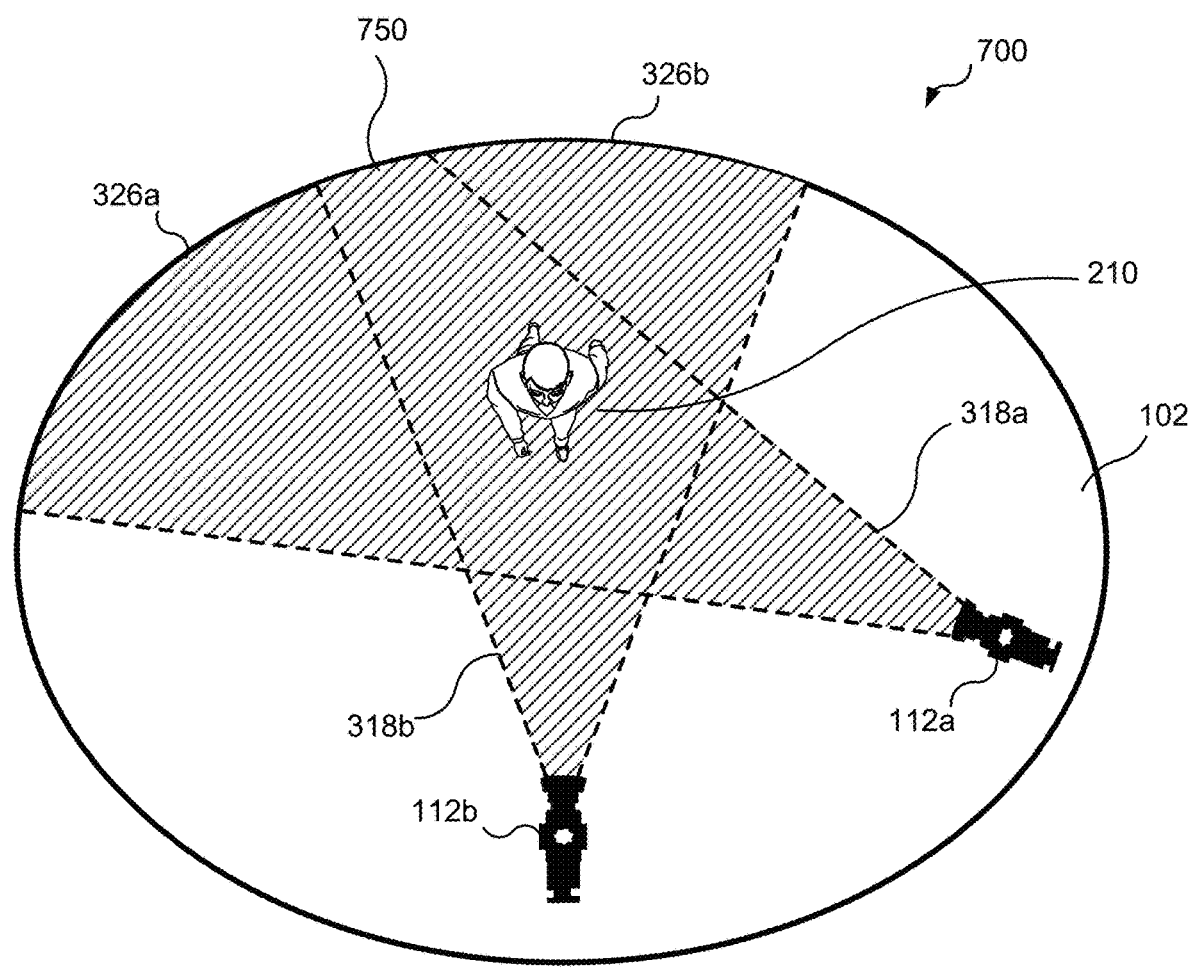
FIG. 8 is a simplified illustration of the immersive content production system shown in FIG. 7 depicting the frustums of the multiple taking camera from a top view.

Some embodiments of the invention include multiple taking cameras. For example, FIG. 7 illustrates an exemplary embodiment of an immersive content production system 700 that includes two taking cameras 112a and 112b and FIG. 8 is a simplified top view of production system 700. FIGS. 7 and 8 depict a performer 210 in a performance area 102 surrounded at least partially by multiple displays 104 that display scenery images 214 to be captured by the multiple taking cameras. The multiple taking cameras (shown as a first taking camera 112a and a second taking camera 112b) can be directed at a performance area 102 (including the virtual environment presented on the displays 104 (e.g., the LED or LCD display walls) to concurrently capture images. Although only one performer 210 is depicted in the performance area 102 in FIG. 7, multiple performers can be within the performance area as well as multiple props and set decorations.

The taking cameras 112a, 112b can be pointed in different directions and have different fields of views. For example, taking camera 112a can have a field of view defined by frustum 318a while taking camera 112b can have a field of view defined by frustum 318b. Thus, each taking camera 112a, 112b can capture a different portion of the immersive environment presented on displays 104. For example, taking camera 112a can capture portion 326a while taking camera 112b can capture portion 326b.

In some instances the fields of view of the multiple taking cameras will overlap as indicated by region 750 shown in each of FIGS. 7 and 8. Since the perspective-correct renderings of the multiple cameras can be different in the overlapping regions, embodiments of the invention can interleave the cameras and the perspective-correct renderings for each camera in order to isolate the camera feeds from each other. For example, in a scenario with two taking cameras 112a, 112b in which each camera has a frame rate of 60 fps, camera 112a can be set to capture images on the even frames while camera 112b can be set to capture images on the odd frames. Content production system 700 can be synchronized with the cameras such that it generates and displays content for the area 326a when taking camera 112a is capturing images and generates and displays content for area 326b when taking camera 112b is capturing images. Interleaving the perspective-correct content in this manner ensures that each taking camera is capturing images with a background from scenery 214 that matches the perspective of the camera even in the areas 750 where the cameras have overlapping fields of view.

It can also be beneficial to interleave the immersive content generated for each camera's field of view in scenarios where two taking cameras (e.g., camera 112a and camera 112b) face each other in opposing directions and do not have overlapping fields of view. Such a scenario can occur, for example, during a complicated action scenes (e.g., a fight scene) in which multiple cameras would be used to capture as much video as possible in a single take. In this scenario, even though the multiple cameras might not have overlapping fields of view, the display lighting from outside the frustum of camera 112a can pollute images being taken for camera 112b. Similarly, the display lighting from outside the frustum of camera 112b can pollute the images being taken for camera 112a. Accordingly, interleaving the immersive content generated for each camera's field of view as described above can be used to resolve the light pollution for each of the taking cameras.

Figure 9:
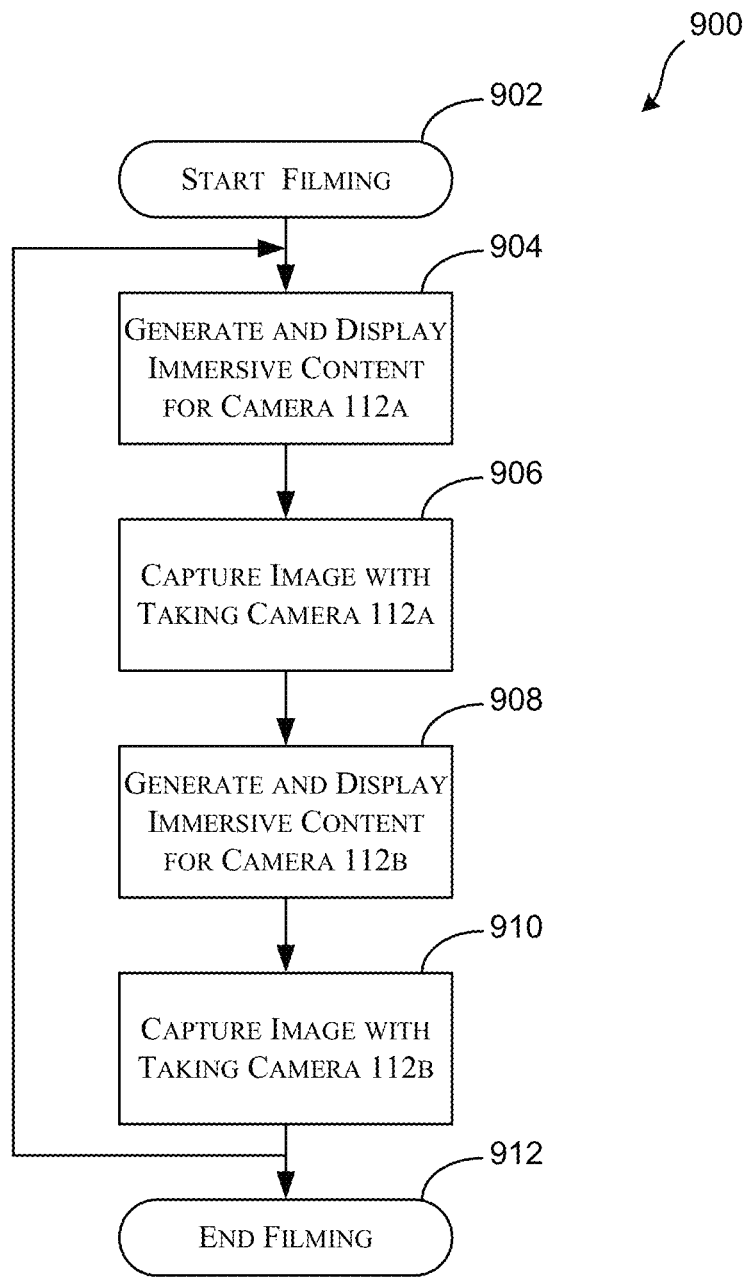
FIG. 9 illustrates a flow diagram of a second exemplary method of rendering images using an immersive content production system.

FIG. 9 illustrates a flow diagram for an exemplary method 900 of using an immersive content production system according to embodiments of the invention in which two separate taking cameras are used to capture images from a performance. The performance can include, for example, one or more actors performing on stage 102 in front of the two taking cameras. The performance can be filmed by the taking cameras between a start (block 902) of the performance and the end (block 912) of the performance. During the performance method 900 includes generating immersive content specific to each of the two taking cameras and displaying the immersive content on displays 104 at alternating high-frequency intervals set to the frame rate of the cameras. For example, as shown in FIG. 9, method 900 can include generating and displaying immersive content for a first taking camera, for example taking camera 112a (block 904) and then capturing images of a performance with the first taking camera (block 906). After the first taking camera captures an image, method 900 can also include generating and displaying immersive content for a second taking camera, for example taking camera 112b (block 908) and then capturing images of a performance with the second taking camera (block 910).

The steps of generating and displaying immersive content for each of the taking cameras (blocks 904 and 908) can include all of the various steps as described above with respect to FIGS. 5 and 6. That is, block 904 can include the steps described with respect to FIG. 5 or the steps described with respect to FIG. 6 where the perspective-correct view is rendered from the position and perspective of taking camera 112a. Similarly, block 908 can include the steps described with respect to FIG. 5 or the steps described with respect to FIG. 6 where the perspective-correct view is rendered from the position and perspective of taking camera 112b.

Method 900 synchronizes the taking cameras with the presentation of immersive content on displays 104 such that, for each taking camera, immersive content viewed by the camera is generated from its perspective correct view. That is, when taking the first taking camera 112a is capturing an image, the immersive content on displays 104 is generated from the perspective of taking camera 112a in the area of the displays that matches the field of view of taking camera 112a (i.e., frustum 326a). Similarly, when taking the second taking camera 112a is capturing an image, the immersive content on displays 104 is generated from the perspective of taking camera 112b in the area of the displays that matches the field of view of taking camera 112b (i.e., frustum 326b). As an example, consider an immersive content production system in which there are two taking cameras and production system is set to generate immersive content at a rate of 48 frames per second. Each of the first and second taking cameras can be set to capture video at a frame rate of 24 fps. Content for the first taking camera can be presented on the displays 104 during the even frames and content for the second taking camera can be presented on the displays during the odd frames so that the cameras never capture content intended for the other camera.

Alternating the immersive content presented in the frustums of the taking cameras may result in some flickering or strobing in the portions 326a and 326b of the displays as the content presented in those portions changes at the frame of the system. The areas 326a and 326b can be, however, a relatively small portion of the overall displays 104 surrounding the performance area and the portions of displays 104 outside the fields of view of the two cameras can remain constant as the global view can be static or relatively static. Also, performers will often be looking away from areas 326a, 326b out towards the taking cameras making any such flickering less noticeable and less distracting.

The sequence of generating and displaying immersive content and capturing the immersive content for the two cameras can repeat itself throughout an entire performance or filming session. At the end of the filming session, content captured by the taking cameras can then be used or further processed using various post processing techniques and systems to generate content, such as movies, television programming, online or streamed videos, etc.

The method in FIG. 9 depicts an example in which two taking cameras are used to capture images from a performance but it is to be understood that the method is applicable to immersive content production systems in which more than two taking cameras are used. In embodiments more than two taking cameras are used, the frame rate of the system can be set to equal the frame rate of each taking camera times the number of taking cameras. For example, in a three camera system in which each camera is operated at a rate of 24 fps, the production system can be set to generate immersive content at a rate of 72 frames per second. In a four camera system, at a rate of 96 fps, etc.

Although FIG. 9 depicts the start filming 902 and end filming 912, the elements described herein can be performed outside the context of filming. For example, the images for the taking cameras can be captured prior to filming, interleaved for the virtual environment prior to filming. It should be appreciated that the specific steps illustrated in FIG. 9 provide particular techniques for capturing content for an immersive environment according to various embodiments of the present disclosure. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives In some embodiments in which multiple taking cameras are employed, other approaches of isolating the immersive content generated for one camera's field of view from the immersive content generated for another camera's field of view are possible. For example, other embodiments can use polarized filters or color filters arrays (e.g., Bayer filter (red-green-blue (RGB)), a cyan yellow magenta, or X-trans filter) to isolate different camera feeds from each other. And in some embodiments, an artificial perspective can be created to reduce visual artifacts that might be otherwise created from different camera views. For example, if camera 112a and camera 112b have different fields of view, then an artificial viewpoint perspective can be estimated for a notional viewpoint between the two cameras. This artificial viewpoint perspective would be semi-correct for both camera 112a and camera 112b but not completely correct for either camera. While this approach can create some undesirable parallax effects, if the different camera fields of view are not too far apart, the parallax effects may not be easily noticeable.

The various methods described herein can be implemented by a computer system such different steps, or each step of the methods described, can be executed automatically by the computer system, and/or can be provided with inputs/outputs involving a user. For example, a user can provide inputs for each step in a method, and each of these inputs can be in response to a specific output requesting such an input, wherein the output is generated by the computer system. Each input can be received in response to a corresponding requesting output. Furthermore, inputs can be received from a user, from another computer system as a data stream, retrieved from a memory location, retrieved over a network, requested from a web service, and/or the like. Likewise, outputs can be provided to a user, to another computer system as a data stream, saved in a memory location, sent over a network, provided to a web service, and/or the like. In short, each step of the methods described herein can be performed by a computer system, and can involve any number of inputs, outputs, and/or requests to and from the computer system which may or may not involve a user. Those steps not involving a user can be said to be performed automatically by the computer system without human intervention. Therefore, it will be understood in light of this disclosure, that each step of each method described herein can be altered to include an input and output to and from a user, or can be done automatically by a computer system without human intervention where any determinations are made by a processor. Furthermore, some embodiments of each of the methods described herein can be implemented as a set of instructions stored on a tangible, non-transitory storage medium to form a tangible software product.

In some instances the use of video display screens (e.g., LED displays) in digital videography can result in an undesirable moiré patterns when capturing images generated by the display screens. The moiré pattern is a visual perception that occurs when an opaque pattern with transparent gaps is overlapped with a similar but different pattern or same pattern at a different size or angle. The visual result is a repeating set of unique patterns or colors and can degrade the initial quality of the original image. While the human eye can detect average colors for an area, a digital video camera can detect the differences between an active LED area and the empty areas surrounding the LED resulting in a moiré effect. Previous methods to alleviate the moiré effect include changing the camera angle, changing the focal length, adjusting the focus of the camera, reducing the camera shutter speed (for still images), or editing the image post production. Modifications to the LED display itself can reduce or eliminate the moiré effect without having to implement one of the known techniques.

Some embodiments employ techniques to reduce the moiré effect by, for example, forming a milky translucent or semi-translucent layer over the LEDS to more evenly distribute the light from the LEDs so they do not appear as a point source. Additionally, baffles or shaders can be added around the LED to form a scattering cone in order to absorb the stray light. In some embodiments, the moiré effect is reduced by distributing the LEDs in a random, non-repeating pattern throughout the display. The LED pattern can be arranged in a non-uniform or stochastic sampling pattern. Using a non-uniform LED pattern can reduce the moiré effect because the LED pattern would not be detected by the CMOS of the camera.

Figure 10:
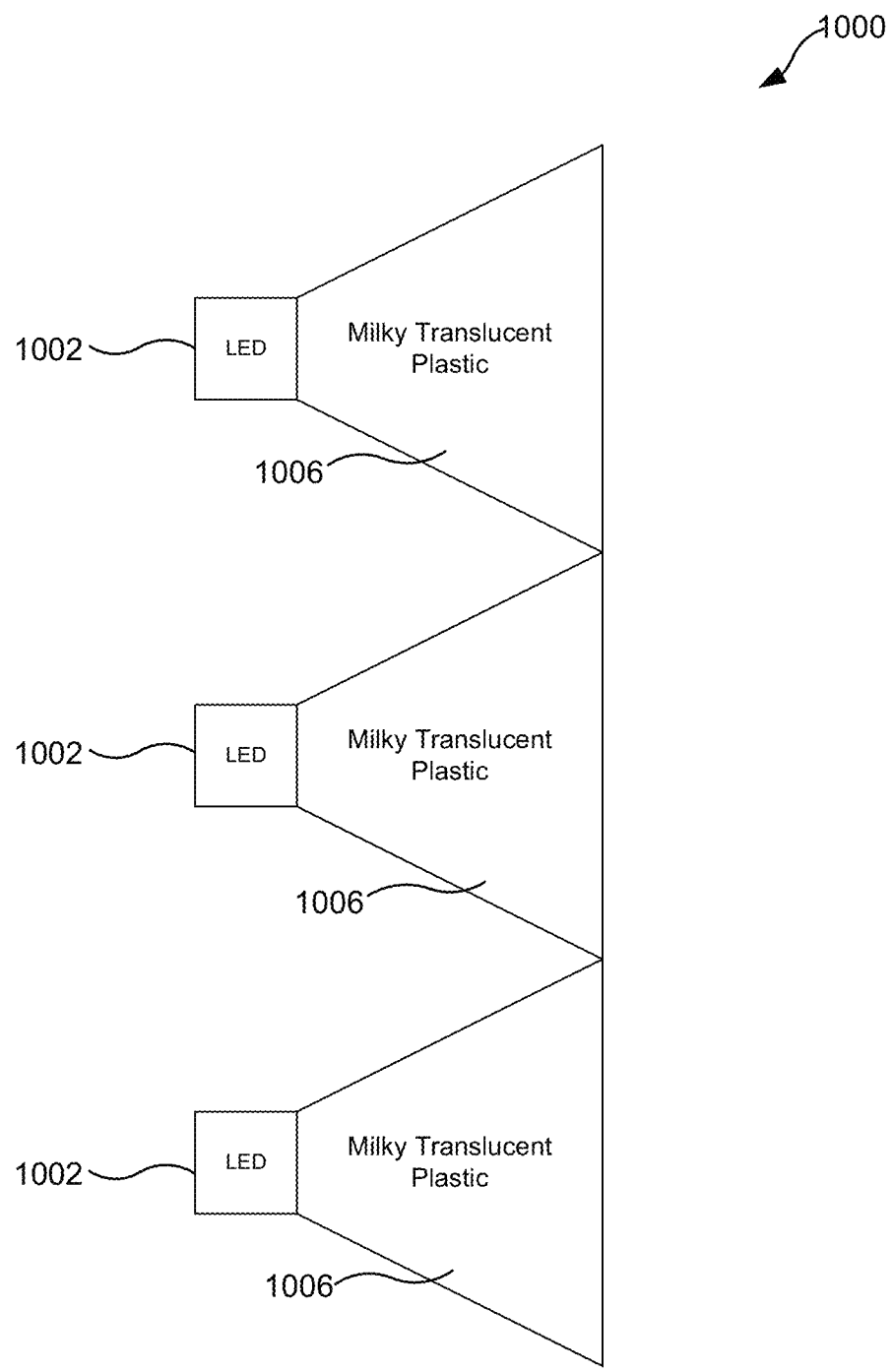
FIG. 10 illustrates a representative configuration of frustum shaped objects for display elements of the immersive content production system.

FIG. 10 illustrates a representative configuration of frustum shaped objects for display elements of the immersive content production system. In some embodiments, as shown in FIG. 10, each LED display 1000 may include a translucent or semi-translucent (e.g., milky translucent) frustum shaped object 1006 overlaying the LED 1002 in order to avoid gaps that can cause visual issues. The frustum shaped object 1006 can be made of any suitable material with translucent or semi-translucent properties, such as plastic or glass. For example, the frustum shaped object 1006 may include glass that is "frosted" through a sandblasting or etching technique. As another example, the frustum shaped object 1006 may be made of glass with particles having refractive indexes different from the glass itself. As a result, the frustum shaped object 1006 may exhibit semi-transparent and "milky" visual characteristics. In some instances, usage of the frustum shaped object 1006 may lead to external light reflecting/scattering into that cone of the frustum shaped object 1006 as well as reducing the contrast ratio of the LED display 1000.

Figure 11A:
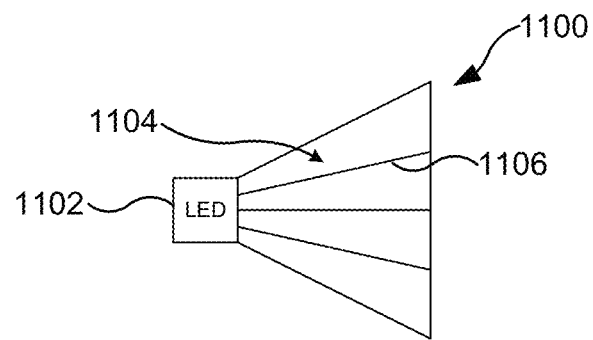
FIGS. 11A-11C illustrates multiple embodiments of representative baffle configurations.
Figure 11B:
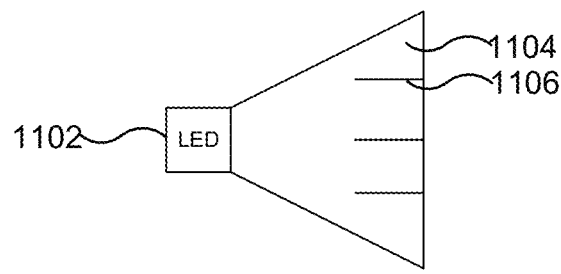
Figure 11C:
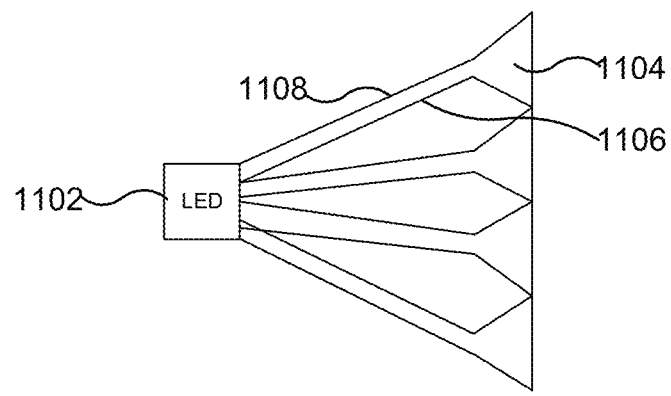

In certain embodiments, baffles or shaders can be added into the scattering cone of the LED in order to absorb or swallow stray light. FIGS. 11A-11C illustrates multiple embodiments of representative baffle configurations for an LED display 1100 with an LED 1102 and a scattering cone 1104 of the LED having baffles or shaders 1106. Such baffles or shaders 1106 may have an opaque surface (e.g., be black in color) and have a threshold roughness in texture. The opaque surface and roughness in texture may facilitate the absorption of stray light. In some embodiments, the baffles 1106 may be thin metal sheets with tiny soot particles below a threshold size that are attached to the sheets. In other embodiments, the baffles 1106 can be made of sand-blasted plastic sheets of a black or other dark color. The sand-blasting of the plastic sheets may make the sheets suitably rough in order to effectively absorb stray light. The baffles 1106 can be configured in any suitable manner to effectively absorb stray light.

As shown in FIG. 11A, the baffles 1106 may be directed to the LED display in one embodiment. As shown in FIG. 11B, the baffles 1106 can be configured orthogonal to the LED display 1100. As shown in FIG. 11C, the baffles 1106 can surround light fibers/tubes 1108 of the frustum shaped object. In some embodiments, the light fiber/tubes 1108 may be cylindrical in the conduit portion and gradually change to a square shape at the outlet portion 1104. FIG. 11C shows the conduit portion 1108 and the outlet portion 1104. As mentioned, the baffles 1106 would surround or wrap around the light fibers/tubes 1108 in order to absorb stray light.

Figure 12A:
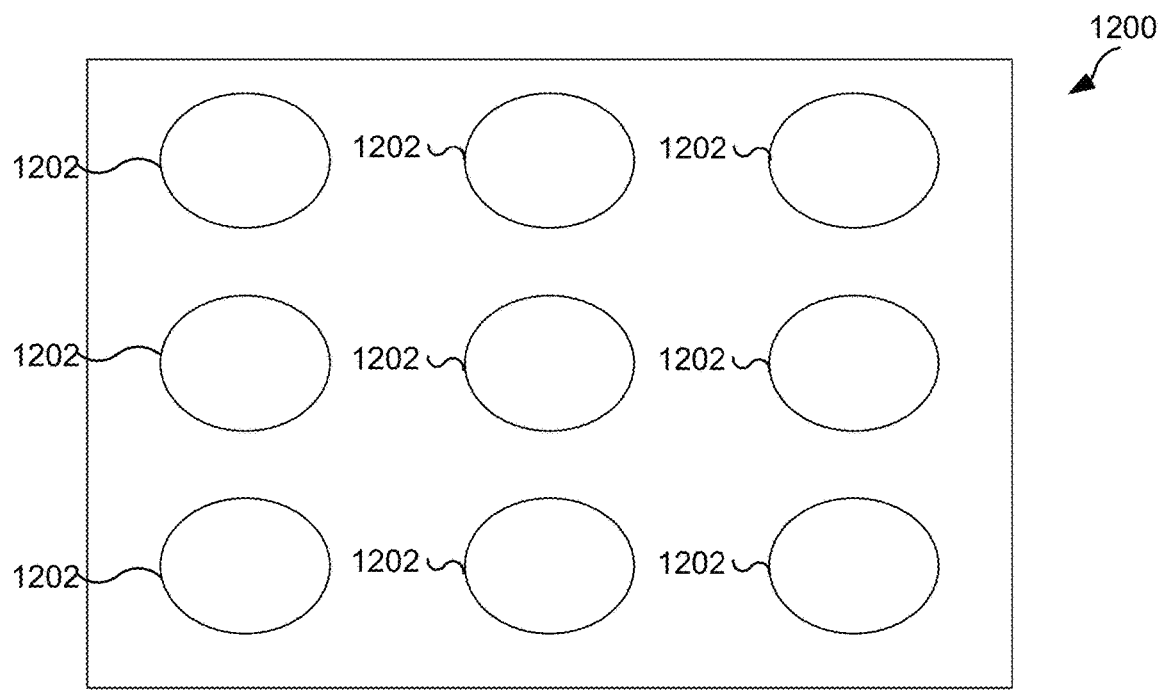
FIG. 12A shows a representative example of the positions of light emitting diodes in current LED displays.

FIG. 12A shows a representative example of the positions of light emitting diodes in current LED displays. LED displays 1200 are generally composed of a plurality of individual light emitting diodes 1202 that are operated together in order to display images on the LED displays 1200. In a typical pattern for a LED display 1200, the individual light emitting diodes 1202 are mounted in a row/column grid pattern. FIG. 12 illustrates an exemplary three LED 1202 by three LED 1202 pattern. Other patterns can be implemented. Current camera image sensors can be additionally configured in a similar row/column grid pattern. Due to these circumstances, images captured by a digital camera of images shown on LED displays can exhibit or include moiré artifacts. Such artifacts can be distracting to viewers.

Figure 12B:
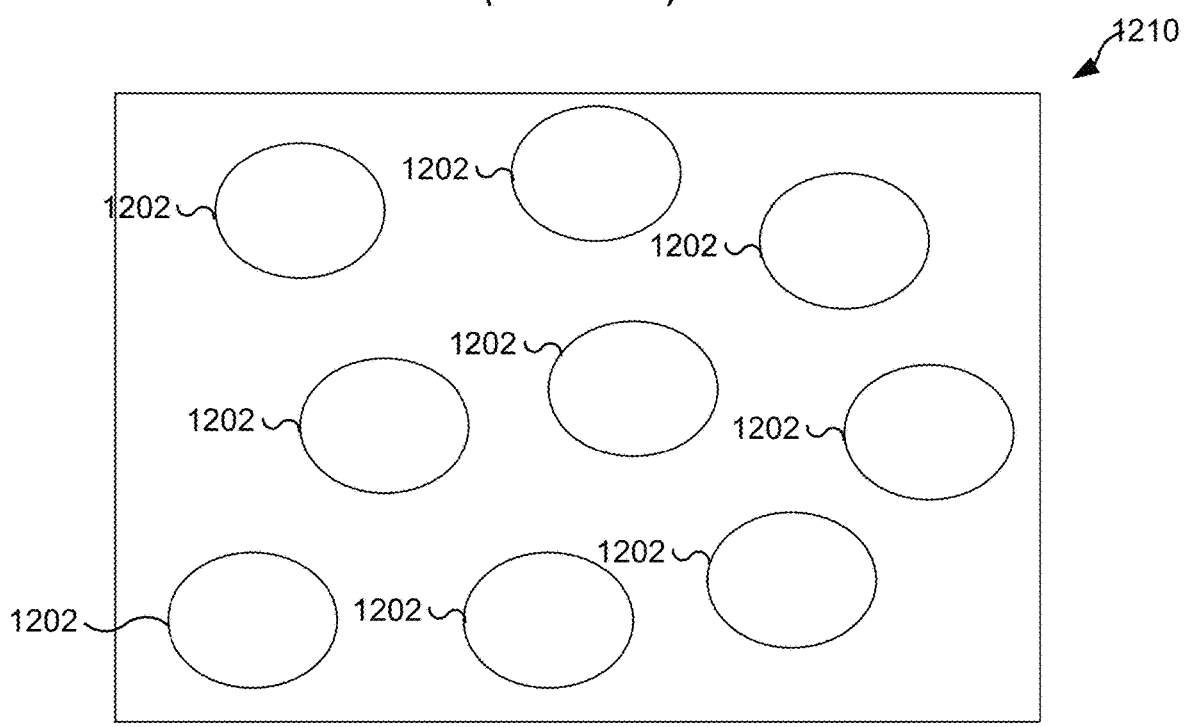
FIG. 12B shows representative positions of light emitting diodes for LED displays of the immersive content production system.

FIG. 12B shows representative positions of light emitting diodes for an LED display 1210 of the immersive content production system. One method to mitigate or eliminate the moiré artifacts is to manufacture LED displays in such a way that the positions of the individual diodes 1202 are randomly or pseudo-randomly positioned on the LED display 1210 according to a stochastic sampling pattern. In this way, issues relating to aliases are swapped for less visually distracting noise. In some instances, the individual diodes 1202 can be randomly or pseudo-randomly positioned on the display 1210 according to one of a jittering pattern, a Poisson pattern, or a Poisson disc pattern. In some embodiments, stochastic sampling may be performed on the standard row/column grid pattern employed by current LED display 1200 in order to obtain a resulting pattern. In some embodiments, the resulting pattern may then be used to aid (e.g., specify the locations of each individual diode 1202 for the LED display 1210) in the manufacturing of the LED displays 1210 for the immersive content production system. In some embodiments, the immersive content production system may receive input images formatted for LED displays 1200 having a standard row/column grid pattern. Based on information regarding the randomly (or pseudo-randomly) distributed positions of its individual diodes, the content production system may convert the input images so that the images may be correctly displayed. FIG. 12A illustrates a representative example of the positions of the individual diodes 1202 of a portion of a current LED display 1200. FIG. 12B shows a representative example of the positions of the individual diodes 1202 of a portion of an LED display 12010 of the immersive content production system. As shown in FIG. 12B, the positions of the individual diodes (e.g., diode 601) have been perturbed from the standard row/column grid pattern according to a stochastic sampling pattern.

Figure 13:
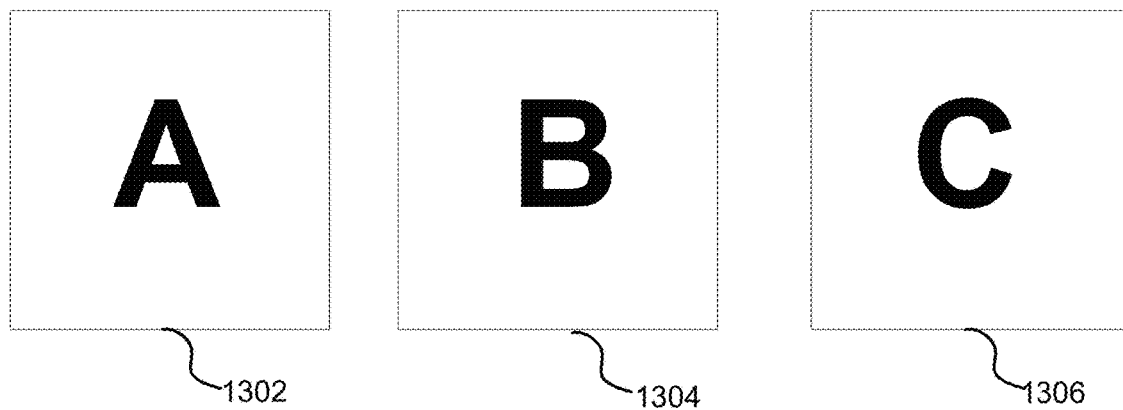
FIG. 13 illustrates an embodiment configuration combining LED patterns.
Figure 13:
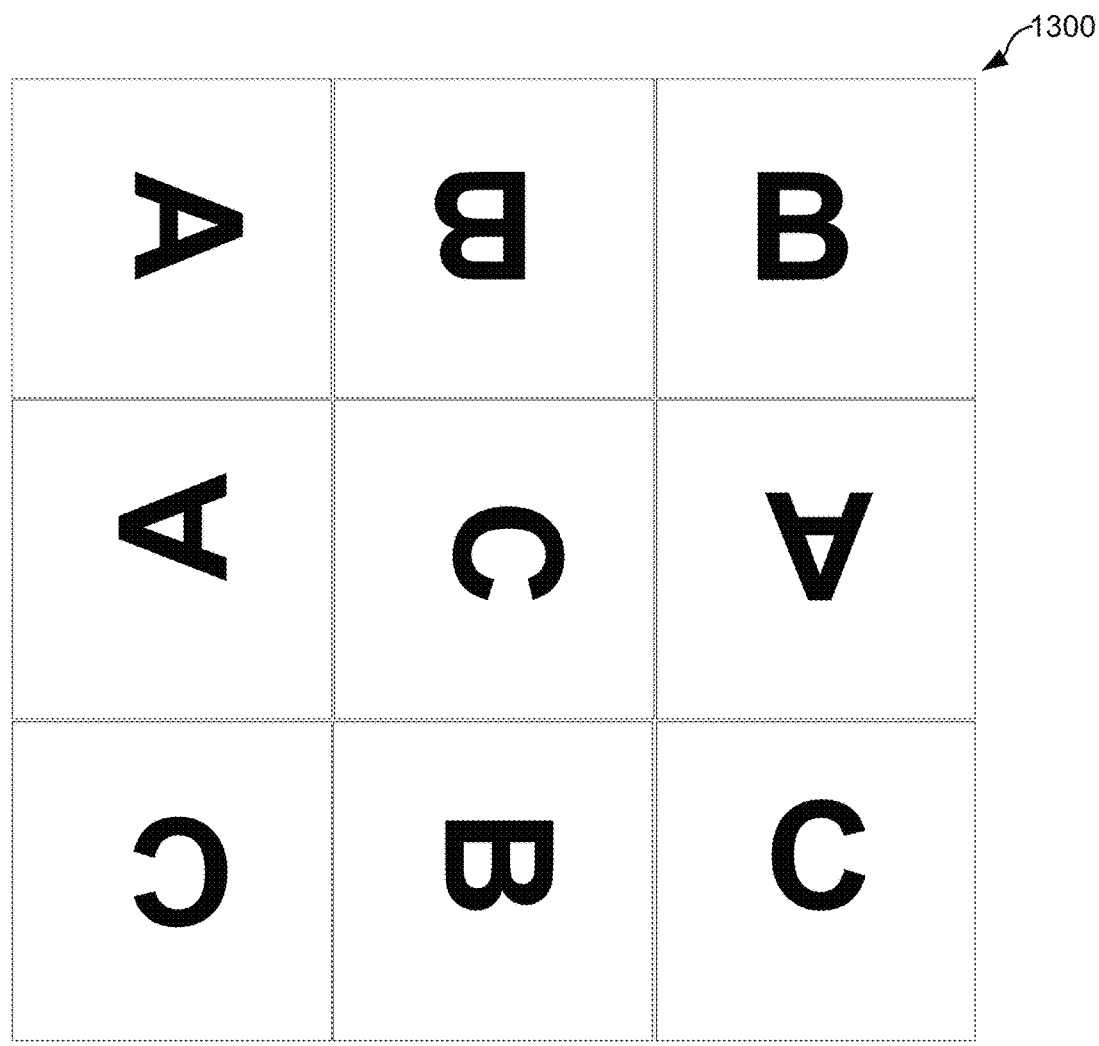

FIG. 13 illustrates an embodiment configuration of an LED display 1300 manufactured by combining various different LED patterns. As described above, a random or psuedo-random pattern can reduce or eliminate undesirable moiré patterns. In one embodiment, several different diode panel patterns 1302, 1304, and 1306 can be combined by manipulating the various panel patterns 1302, 1304, and 1306. The manipulating can include rotating or inverting the various patterns, such that the resulting display 1200 can have LEDs randomly distributed. In the exemplary display 1300, includes nine LED panels combined to produce a pseudo random display. Embodiments can include many more than three different panel patterns. In addition, the final display can include more than nine panels.

Figure 14:
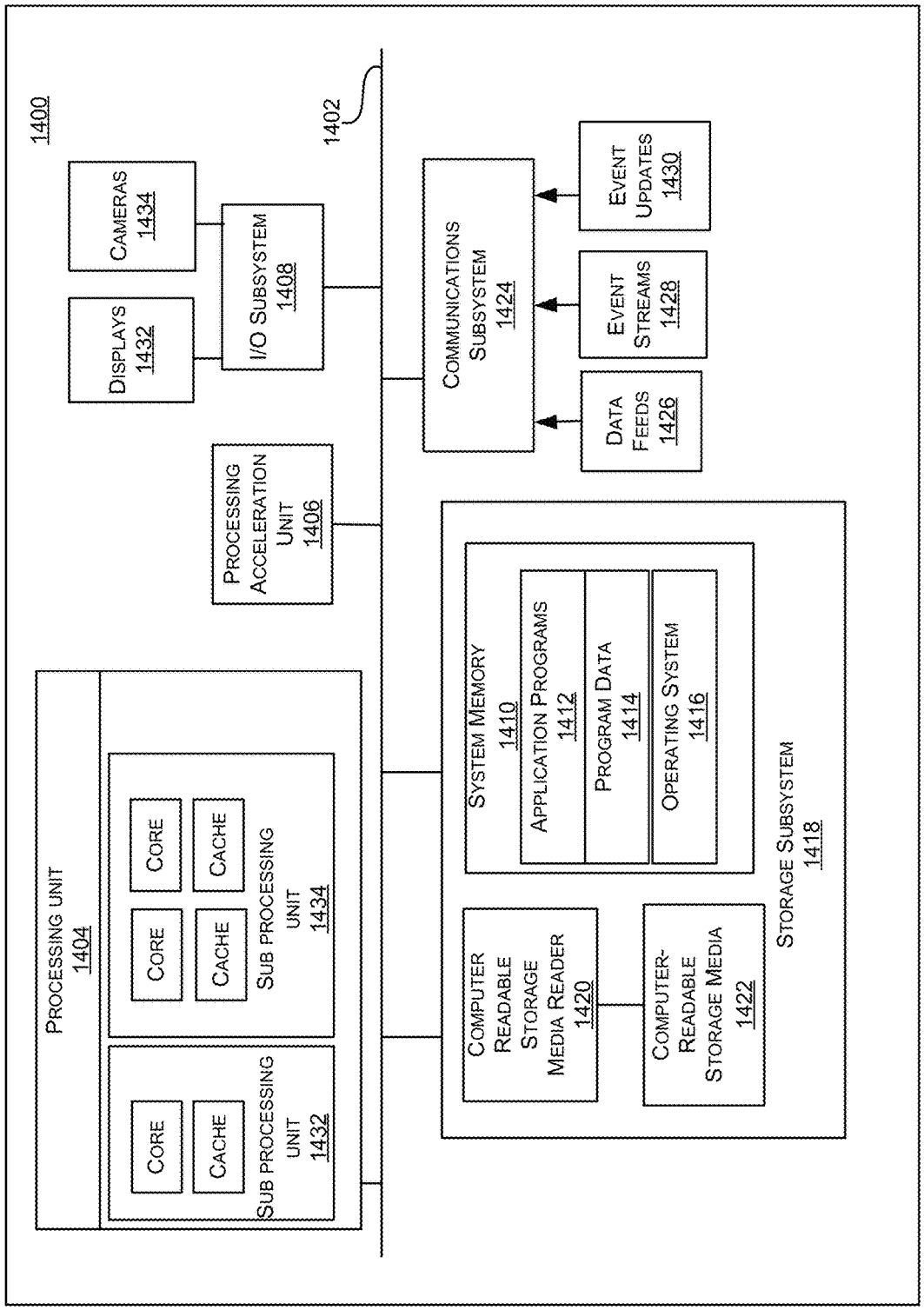
FIG. 14 illustrates a simplified block diagram of an immersive content production system.

Each of the embodiments disclosed herein can be implemented in a special-purpose computer system. FIG. 14 illustrates a computer system 1400, in which various embodiments described herein can be implemented. The system 1400 can be used to implement any of the computer systems described above. As shown in the figure, computer system 1400 includes a processing unit 1404 that communicates with a number of peripheral subsystems via a bus subsystem 1402. These peripheral subsystems can include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem can utilize multiple buses. Bus subsystem 1402 can be any of several types of bus structures including a memory bus or memory controller, a peripheral bus, and a local bus using any of a variety of bus architectures. For example, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors can be included in processing unit 1404. These processors can include single core or multicore processors. In certain embodiments, processing unit 1404 can be implemented as one or more independent processing units 1432 and/or sub processing unit 1434 with single or multicore processors included in each processing unit. In other embodiments, processing unit 1404 can also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 can additionally include a processing acceleration unit 1406, which can include a digital signal processor (DSP), a special-purpose processor, and/or the like. And, in some embodiments, the processing unit or another component of system 1400 can include and/or operate a real-time gaming engine or other similar real-time rendering engine. Such an engine can render two-dimensional (2D) images from 3D data at interactive frame rates (e.g., 24, 48, 72, 96, or more frames per second). In one aspect, the real-time gaming engine can load the virtual environment for display on the displays surrounding the performance area. In some embodiments, the real-time gaming engine can load virtual assets into the virtual environment. The real-time gaming engine can then permit the virtual assets to interact or move according to simulated physics information stored by the real-time gaming engine. The real-time gaming engine can also update the virtual environment based on the movement and orientation of the taking camera(s).

I/O subsystem 1408 can include user interface input devices and user interface output devices. User interface input devices can include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices can include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices can also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices can include voice recognition sensing devices that enable users to interact with voice recognition systems (e.g., Siri® navigator), through voice commands. In some embodiments, the user interface devices enable an operator to provide input indicating the types of virtual assets and/or effects to be integrated into the virtual environment displayed during the performance. The operator can also indicate the particular configurations or trigger movements of the performer and/or physical objects in the performance area that are to be used to begin the loading and presentation of certain virtual assets. In some embodiments, the input received from the operator can occur in real-time and/or concurrently with a performance The system 1400 can include one or more displays 1432. The displays 1432 can be the displays 104 depicted in FIG. 1. The displays 1432 can form an enclosed performance area. In some embodiments, the displays 1432 can be formed from multiple light emitting diode (LED) panels. In some embodiments, the displays 1432 can be formed via multiple liquid crystal display (LCD) panels or thin-film transistor liquid-crystal display (TFT LCD) panels.

The system 1400 can include one or more cameras 1434. The one or more cameras can be digital cameras. Digital cinematography captures motion pictures digitally in a process analogous to digital photography. Professional cameras can include the Sony CineAlta(F) Series, Blackmagic Cinema Camera, RED ONE, Arriflex D-20, D-21 and Alexa, Panavisions Genesis, Silicon Imaging SI-2K, Thomson Viper, Vision Research Phantom, IMAX 3D camera based on two Vision Research Phantom cores, Weisscam HS-1 and HS-2, GS Vitec noX, and the Fusion Camera System. Digital cinematography cameras can capture images using complementary metal-oxide semiconductor (CMOS) or charge coupled device (CCD) sensors, usually in one of two arrangements. Single chip cameras that are designed specifically for the digital cinematography market often use a single sensor (much like digital photo cameras), with dimensions similar in size to a 16 or 35 mm film frame or even (as with the Vision 65) a 65 mm film frame. An image can be projected onto a single large sensor exactly the same way it can be projected onto a film frame, so cameras with this design can be made with positive lock (PL), Panavision (PV) and similar mounts, in order to use the wide range of existing high-end cinematography lenses available. Their large sensors also let these cameras achieve the same shallow depth of field as 35 or 65 mm motion picture film cameras, which many cinematographers consider an essential visual tool.

Unlike other video formats, which are specified in terms of vertical resolution (for example, 1080p, which is 1920×1080 pixels), digital cinema formats are usually specified in terms of horizontal resolution. As a shorthand, these resolutions are often given in "nK" notation, where n is the multiplier of 1424 such that the horizontal resolution of a corresponding full-aperture, digitized film frame is exactly 1024n pixels.

For instance, a 2K image is 2048 pixels wide, and a 4K image is 4096 pixels wide. Vertical resolutions vary with aspect ratios though; so a 2K image with an HDTV (16:9) aspect ratio is 2048×1152 pixels, while a 2K image with a standard definition television (SDTV) or Academy ratio (4:3) is 2048×1536 pixels, and one with a Panavision ratio (2.39:1) would be 2048×856 pixels, and so on. Due to the "nK" notation not corresponding to specific horizontal resolutions per format a 2K image lacking, for example, the typical 35 mm film soundtrack space, is only 1828 pixels wide, with vertical resolutions rescaling accordingly.

All formats designed for digital cinematography are progressive scan, and capture usually occurs at the same 24 frame per second rate established as the standard for 35 mm film. Some films have a High Frame Rate of 48 fps, although most traditional theaters use 24 fps. The DCI standard for cinema usually relies on a 1.89:1 aspect ratio, thus defining the maximum container size for 4K as 4096×2160 pixels and for 2K as 2048×1080 pixels.

Broadly, several workflow paradigms can be used for data acquisition and storage in digital cinematography. With video-tape-based workflow, video is recorded to tape on set. This video is then ingested into a computer running non-linear editing software, using a deck. Upon ingestion, a digital video stream from tape is converted to computer files. These files can be edited directly or converted to an intermediate format for editing. Then video is output in its final format, possibly to a film recorder for theatrical exhibition, or back to video tape for broadcast use. Original video tapes are kept as an archival medium. The files generated by the non-linear editing application contain the information necessary to retrieve footage from the proper tapes, should the footage stored on the computer's hard disk be lost. With increasing convenience of file-based workflows, the tape-based workflows have become marginal in recent years.

Digital cinematography can use tapeless or file-based workflows. This trend has accelerated with increased capacity and reduced cost of non-linear storage solutions such as hard disk drives, optical discs, and solid-state memory. With tapeless workflows digital video is recorded as digital files onto random-access media like optical discs, hard disk drives or flash memory-based digital magazines. These files can be easily copied to another storage device, typically to a large RAID (array of computer disks) connected to an editing system. Once data is copied from the on-set media to the storage array, they are erased and returned to the set for more shooting.

Such RAID arrays, both of managed (for example, storage area networks (SANs) and networked attached storage (NASs) and unmanaged (for example, just a bunch of disks (JBoDs) on a single computer workstation), are necessary due to the throughput required for real-time (320 Megabits per second for 2K @ 24 frames per second) or near-real-time playback in post-production, compared to throughput available from a single, yet fast, hard disk drive. Such requirements are often termed as on-line or cloud storage. Post-production not requiring real-time playback performances (typically for lettering, subtitling, versioning and other similar visual effects) can be migrated to slightly slower RAID stores.

Short-term archiving, if ever, is accomplished by moving the digital files into slower redundant array of independent disks (RAID) arrays (still of either managed and unmanaged type, but with lower performances), where playback capability is poor to non-existent (unless via proxy images), but minimal editing and metadata harvesting still feasible. Such intermediate requirements easily fall into the mid-line storage category.

Long-term archiving is accomplished by backing up the digital files from the RAID, using standard practices and equipment for data backup from the information technology industry, often to data tapes (like linear tape open (LTOs)).

The system can include one or more spherical cameras. A spherical camera can be called an omnidirectional camera, also known as 360-degree camera, is a camera having a field of view that covers approximately the entire sphere or at least a full circle in the horizontal plane. 360-degree videos, also known as immersive videos, or spherical videos, are video recordings where a view in every direction is recorded at the same time, shot using an omnidirectional camera or a collection of cameras. During playback on normal flat display the viewer has control of the viewing direction like a panorama. It can also be played on a displays or projectors arranged in a sphere or some part of a sphere.

360-degree video is typically recorded using either a special rig of multiple cameras, or using a dedicated camera that contains multiple camera lenses embedded into the device, and filming overlapping angles simultaneously. Through a method known as video stitching, this separate footage is merged into one spherical video piece, and the color and contrast of each shot is calibrated to be consistent with the others. This process is done either by the camera itself, or using specialized software that can analyze common visuals and audio to synchronize and link the different camera feeds together. Generally, the only area that cannot be viewed is the view toward the camera support.

360-degree video is typically formatted in an equirectangular projection and is either monoscopic, with one image directed to both eyes, or stereoscopic, viewed as two distinct images directed individually to each eye for a 3D effect. Due to this projection and stitching, equirectangular video exhibits a lower quality in the middle of the image than at the top and bottom.

Specialized omnidirectional cameras and rigs have been developed for the purpose of filming 360-degree video, including rigs such as GoPro's Omni and Odyssey (which consist of multiple action cameras installed within a frame), and contained cameras like the HumanEyes Vuze and Nokia OZO, There have also been handheld dual-lens cameras such as the Ricoh Theta S, Samsung Gear 360, Garmin VIRB 360, and the Kogeto Dot 360—a panoramic camera lens accessory developed for the iPhone 4, 4S, and Samsung Galaxy Nexus.

User interface input devices can also include, without limitation, three dimensional (3-D) mice, joysticks or pointing sticks, gamepads and graphic tablets, and audio/visual devices such as speakers, digital cameras, digital camcorders, portable media players, webcams, image scanners, fingerprint scanners, barcode reader 3-D scanners, 3-D printers, laser rangefinders, and eye gaze monitoring devices. Additionally, user interface input devices can include, for example, medical imaging input devices such as computed tomography, magnetic resonance imaging, position emission tomography, medical ultrasonography devices. User interface input devices can also include, for example, audio input devices such as MIDI keyboards, digital musical instruments and the like.

User interface output devices can include a display subsystem, indicator lights, or non-visual displays such as audio output devices, etc. The display subsystem can be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices can include, without limitation, a variety of display devices that visually convey text, graphics and audio/video information such as monitors, printers, speakers, headphones, automotive navigation systems, plotters, voice output devices, and modems.

Computer system 1400 can comprise a storage subsystem 1418 that comprises software elements, shown as being currently located within a system memory 1410. System memory 1410 can store program instructions that are loadable and executable on processing unit 1404, as well as data generated during the execution of these programs.

Depending on the configuration and type of computer system 1400, system memory 1410 can be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 can include multiple different types of memory, such as static random access memory (SRAM) or dynamic random access memory (DRAM). In some implementations, a basic input/output system (BIOS), containing the basic routines that help to transfer information between elements within computer system 1400, such as during start-up, can typically be stored in the ROM. By way of example, and not limitation, system memory 1410 also illustrates application programs 1412, which can include client applications, web browsers, mid-tier applications, relational database management systems (RDBMS), etc., program data 1414, and an operating system 1416. By way of example, operating system 1416 can include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 can also provide a tangible computer-readable storage medium for storing the basic programming and data constructs that provide the functionality of some embodiments. Software (programs, code modules, instructions) that when executed by a processor provide the functionality described above can be stored in storage subsystem 1418. These software modules or instructions can be executed by processing unit 1404. Storage subsystem 1418 can also provide a repository for storing data used in accordance with the present invention.

Storage subsystem 1400 can also include a computer-readable storage media reader 1420 that can further be connected to computer-readable storage media 1422. Together and, optionally, in combination with system memory 1410, computer-readable storage media 1422 can comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 can include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 can include, but is not limited to, Zip® drives, flash memory cards, universal serial bus (USB) flash drives, secure digital (SD) cards, DVD disks, digital video tape, and the like. Computer-readable storage media 1422 can also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media can provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 can enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 can also receive input communication in the form of structured and/or unstructured data feeds 1426, event streams 1428, event updates 1430, and the like on behalf of one or more users who can use computer system 1400.

By way of example, communications subsystem 1424 can be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 can also be configured to receive data in the form of continuous data streams, which can include event streams 1428 of real-time events and/or event updates 1430, that can be continuous or unbounded in nature with no explicit end. Examples of applications that generate continuous data can include, for example, sensor data applications, financial tickers, network performance measuring tools (e.g. network monitoring and traffic management applications), clickstream analysis tools, automobile traffic monitoring, and the like.

Communications subsystem 1424 can also be configured to output the structured and/or unstructured data feeds 1426, event streams 1428, event updates 1430, and the like to one or more databases that can be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, can be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention can be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine readable medium. A processor(s) can perform the necessary tasks.

In the foregoing specification, aspects of the invention are described with reference to specific embodiments thereof, but those skilled in the art will recognize that the invention is not limited thereto. Various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method of generating content, the method comprising:
   generating and presenting images of a virtual environment on one or more displays at least partially surrounding a performance area at a first frame rate; and
   capturing a plurality of images of a performer performing in the performance area along with at least some portion of the images of the virtual environment by a first taking camera and a second taking camera wherein each of the first and second taking cameras are set to capture images at frame rate equal to half the first frame rate and the first taking camera is set to capture images on even frames and the second taking camera is set to capture images on odd frames;
   wherein, for each of the first and second taking cameras before capturing the plurality of images, images of the virtual environment within a frustum of the first and second taking cameras are updated to display perspective correct views of the virtual environment on the one or more displays in the generating and presenting step based on movement of the first and second taking cameras, wherein the perspective correct views are generated and presented from a position and an orientation of the first and second taking cameras to match a field of view of the first and second taking cameras at a given point during a performance, and images of the virtual environment outside of the frustum of the first and second taking cameras are not updated based on movement of the first and second taking cameras; and
   generating content based on the plurality of captured images.

2. The method of claim 1 further comprising capturing images of the virtual environment using a spherical camera.

3. The method of claim 1 further comprising tracking a first position of the first taking camera and a second position of the second taking camera within the performance area and wherein images of the virtual environment generated within the frustum of the first taking camera and the second taking camera are generated from the tracked position and perspective of the first taking camera and the second taking camera.

4. The method of claim 3 further comprising wherein images of the virtual environment outside of the frustum of the first taking camera and the second taking camera are generated from a global-view perspective that is different from the perspective of the first taking camera and the second taking camera.

5. The method of claim 1 wherein the images of the virtual environment presented on the one or more displays are updated by:
   rendering a global-view perspective of the virtual environment;
   rendering a first perspective-correct view of the virtual environment from a location and perspective of the first taking camera for an area of the one or more displays within the frustum of the first taking camera;
   rendering a second perspective-correct view of the virtual environment from a location and perspective of the second taking camera for an area of the one or more displays within the frustum of the second taking camera; and
   combining the global-view rendering with the first perspective-correct view rendering and second perspective-correct view rendering such that portions of the virtual environment outside the frustums of the first taking camera and the second taking camera are from the global-view render and portions of the virtual environment within the frustum of the first taking camera and the second taking camera are from the perspective-correct view render.

6. The method of claim 5 further comprising rendering a plurality of virtual lights at different positions on the one or more displays separately from the global-view and perspective-correct renders and adding the rendered virtual lights after combining the global-view and perspective-correct renders so as to preserve the plurality of virtual lights in situations where the perspective-correct render would otherwise over-write one more of the plurality of virtual lights.

7. The method of claim 5 wherein a blending technique is used to combine the render from the location and perspective of the first taking camera and the second taking camera with the render from the global-view perspective in a border region.

8. The method of claim 1 further comprising tracking a motion or a position of the performer by tracking movement of the first taking camera and the second taking camera.

9. A computer-implemented method of generating content, the method comprising:
   generating and presenting images of a virtual environment on one or more displays at least partially surrounding a performance area at a first frame rate; and
   capturing a plurality of images of a performer performing in the performance area along with at least some portion of the images of the virtual environment by N taking cameras where N is an integer greater than one and each of the N taking cameras is set to capture images at frame rate equal to the first frame rate divided by N;
   wherein, for each of the N taking cameras before capturing the plurality of images, images of the virtual environment within a frustum of the camera are updated to display perspective correct views of the virtual environment on the one or more displays in the generating and presenting step based on movement of the camera, wherein the perspective correct views are generated and presented from a position and an orientation of the camera to match a field of view of the camera at a given point during a performance, and images of the virtual environment outside of the frustum of the camera are not updated based on movement of the camera; and
   generating content based on the plurality of captured images.

10. The method of claim 9 further comprising rendering a plurality of virtual lights at different positions on the one or more displays separately from a global-view and perspective-correct renders and adding the rendered virtual lights after combining the global-view and perspective-correct renders so as to preserve the plurality of virtual lights in situations where the perspective-correct renders would otherwise over-write one more of the plurality of virtual lights.

11. The method of claim 9 wherein a blending technique is used to combine renders from a location and a perspective of the N taking cameras with a render from a global-view perspective in a border region.

12. The method of claim 9 further comprising capturing images of the virtual environment using a spherical camera.

13. An immersive content presentation system comprising:
one or more processors; and
one or more memory devices comprising instructions that, when executed by the one or more processors, cause the one or more processors to perform operations comprising:
generating and presenting images of a virtual environment on one or more displays at least partially surrounding a performance area at a first frame rate; and
capturing a plurality of images of a performer performing in the performance area along with at least some portion of the images of the virtual environment by a first taking camera and a second taking camera wherein each of the first and second taking cameras are set to capture images at frame rate equal to half the first frame rate and the first taking camera is set to capture images on even frames and the second taking camera is set to capture images on odd frames;
wherein, for each of the first and second taking cameras before capturing the plurality of images, images of the virtual environment within a frustum of the first and second taking cameras are updated to display perspective correct views of the virtual environment on the one or more displays in the generating and presenting step based on movement of the first and second taking cameras, wherein the perspective correct views are generated and presented from a position and an orientation of the first and second taking cameras to match a field of view of the first and second taking cameras at a given point during a performance, and images of the virtual environment outside of the frustum of the first and second taking cameras are not updated based on movement of the first and second taking cameras; and
generating content based on the plurality of captured images.

14. The system of claim 13, further comprising instructions that, when executed by the one or more processors, cause the one or more processors to perform operations comprising capturing images of the virtual environment using a spherical camera.

15. The system of claim 13, further comprising instructions that, when executed by the one or more processors, cause the one or more processors to perform operations comprising tracking a first position of the first taking camera and a second position of the second taking camera within the performance area and wherein images of the virtual environment generated within the frustum of the first taking camera and the second taking camera are generated from the tracked position and perspective of the first taking camera and the second taking camera.

16. The system of claim 13, wherein images of the virtual environment outside of the frustum of the first taking camera and the second taking camera are generated from a global-view perspective that is different from the perspective of the first taking camera and the second taking camera.

17. The system of claim 13 wherein the images of the virtual environment presented on the one or more displays are updated by:
rendering a global-view perspective of the virtual environment;
rendering a first perspective-correct view of the virtual environment from a location and perspective of the first taking camera for an area of the one or more displays within the frustum of the first taking camera;
rendering a second perspective-correct view of the virtual environment from a location and perspective of the second taking camera for an area of the one or more displays within the frustum of the second taking camera; and
combining the global-view rendering with the first perspective-correct view rendering and second perspective-correct view rendering such that portions of the virtual environment outside the frustums of the first taking camera and the second taking camera are from the global-view render and portions of the virtual environment within the frustum of the first taking camera and the second taking camera are from the perspective-correct view render.

18. A non-transitory computer-readable medium comprising instructions that, when executed by one or more processors, cause the one or more processors to perform operations comprising:
generate and present images of a virtual environment on one or more displays at least partially surrounding a performance area at a first frame rate; and
capture a plurality of images of a performer performing in the performance area along with at least some portion of the images of the virtual environment by a first taking camera and a second taking camera wherein each of the first and second taking cameras are set to capture images at frame rate equal to half the first frame rate and the first taking camera is set to capture images on even frames and the second taking camera is set to capture images on odd frames;
wherein, for each of the first and second taking cameras before capturing the plurality of images, images of the virtual environment within a frustum of the first and second taking cameras are updated to display perspective correct views of the virtual environment on the one or more displays in the generate and present step based on movement of the first and second taking cameras, wherein the perspective correct views are generated and presented from a position and an orientation of the first and second taking cameras to match a field of view of the first and second taking cameras at a given point during a performance, and images of the virtual environment outside of the frustum of the first and second taking cameras are not updated based on movement of the first and second taking cameras; and
generate content based on the plurality of captured images.

19. The non-transitory, computer-readable medium of claim 18, further comprising instructions that, when executed by one or more processors, cause the one or more processors to capture images of the virtual environment using a spherical camera.

20. The non-transitory, computer-readable medium of claim 18, further comprising instructions that, when executed by one or more processors, cause the one or more processors to track a first position of the first taking camera and a second position of the second taking camera within the performance area and wherein images of the virtual environment generated within the frustum of the first taking camera and the second taking camera are generated from the tracked position and perspective of the first taking camera and the second taking camera.

\* \* \* \* \*